US006757897B1

(12) United States Patent
Shi et al.

(10) Patent No.: US 6,757,897 B1
(45) Date of Patent: Jun. 29, 2004

(54) APPARATUS AND METHODS FOR SCHEDULING AND PERFORMING TASKS

(75) Inventors: Zhanhe Shi, San Jose, CA (US); Qingming Ma, Santa Clara, CA (US); Saravanan Agasaveeran, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/515,198

(22) Filed: Feb. 29, 2000

(51) Int. Cl.[7] ............................................... G06F 9/00
(52) U.S. Cl. ..................... 718/102; 718/100; 718/104; 718/103; 718/107; 710/240; 710/243
(58) Field of Search ............................... 709/100, 102, 709/103, 104, 106, 108, 107; 718/100, 102, 107; 710/5, 116, 240, 243

(56) References Cited

U.S. PATENT DOCUMENTS

| | | | | |
|---|---|---|---|---|
| 5,408,663 A | * | 4/1995 | Miller ......................... | 709/104 |
| 5,490,272 A | | 2/1996 | Mathis et al. ................ | 395/650 |
| 5,526,521 A | * | 6/1996 | Fitch et al. .................. | 709/108 |
| 5,528,513 A | * | 6/1996 | Vaitzblit et al. ............. | 709/103 |
| 5,630,128 A | * | 5/1997 | Farrell et al. ................ | 709/103 |
| 5,826,079 A | * | 10/1998 | Boland et al. ............... | 709/102 |
| 5,872,972 A | * | 2/1999 | Boland et al. ............... | 709/102 |
| 5,937,187 A | * | 8/1999 | Kosche et al. ............... | 709/104 |
| 5,987,492 A | * | 11/1999 | Yue .............................. | 709/102 |
| 6,052,707 A | * | 4/2000 | D'Souza ...................... | 709/106 |
| 6,085,215 A | * | 7/2000 | Ramakrishnan et al. ..... | 709/102 |
| 6,269,391 B1 | * | 7/2001 | Gillespie ..................... | 709/100 |
| 6,272,524 B1 | | 8/2001 | Robinson .................... | 709/201 |
| 6,272,526 B1 | | 8/2001 | Robinson .................... | 709/201 |
| 6,272,527 B1 | | 8/2001 | Robinson .................... | 709/201 |
| 6,275,847 B1 | | 8/2001 | Robinson .................... | 709/201 |
| 6,289,369 B1 | * | 9/2001 | Sundaresan ................. | 709/103 |
| 6,430,593 B1 | * | 8/2002 | Lindsley ..................... | 709/103 |
| 6,505,229 B1 | * | 1/2003 | Turner et al. ................ | 709/107 |

* cited by examiner

Primary Examiner—Meng-Al T. An
Assistant Examiner—Lilian Vo
(74) Attorney, Agent, or Firm—Chapin & Huang, LLC.; Barry W. Chapin, Esq.

(57) ABSTRACT

The invention provides unique mechanisms and techniques for a computing device to perform various tasks in a multi-tasking or time sliced environment. A general task scheduling algorithm can select various time slices or priorities for task performance. However, in a dedicated device such as a data communications device, a primary task such as a data transfer task may be so heavily favored by the general task scheduling algorithm, such as in heavy network traffic conditions, that other tasks may be starved of processor time. As such, the system of the invention allows the primary task, to track a first time period Y, and upon expiration of this time period Y, to generate a yield signal to a yielding scheduler. The yielding scheduler can then disable performance of the primary task(s) and track a second time period X during which other tasks may be performed. At the expiration of the second time period X, the primary task(s) which were disabled upon the occurrence of the yield signal are then re-enabled for performance and the yielding scheduler selects a task for performance. Generally, the primary task will again be selected over, for example, lower priority tasks. However, the lower priority tasks will have had a chance to perform irrespective of the general task scheduling algorithm since the primary task(s), which may be heavily scheduled, can control the yielding of processor time. By selecting various values for the time periods X and Y, different aspects of device operation can be controlled to provide a balanced system that can greatly avoid task starvation while also meeting the response time requirements of the primary task and the other lower priority task(s). Since the tasks themselves are given control over the ability to yield time to other tasks, flexibility is provided by the system of the invention.

36 Claims, 6 Drawing Sheets

Y>X

Y=X

Y<X

APPARATUS AND METHODS FOR SCHEDULING AND PERFORMING TASKS

BACKGROUND OF THE INVENTION

A typical computer system includes, among other components, a processing unit (i.e., microprocessor or Central Processing Unit—CPU) that is responsible for performing, executing or interpreting a number of different tasks or processes which process data in some manner within the system. By way of example, a networked data communications device such a router or switch may include a processor that performs a primary task of transferring data in packets, cells, frames or other units between various network interfaces or ports in the data communications device. Besides the primary data transfer task, the processor may also need to perform other tasks such as protocol processing, statistics gathering, fault monitoring/handling, and so forth. While the main purpose of the processor in the data communications device is to perform the data transfer task to transfer data through a network, the device must allow the processor to perform each of the other tasks from time to time and each task may have a different level or class of importance or priority with respect to the other tasks.

Typically, a computer system that performs multiple tasks also includes an operating system that incorporates a task scheduler algorithm, routine, procedure or process. The task scheduler is generally responsible for determining the priority, class or importance of each task and for selecting and scheduling various tasks for performance and initiating the tasks on the processor in a time sliced or multiplexed manner based on the priorities of the various tasks. As an example, perhaps the processor in the data communications device only needs to perform a statistics computation task occasionally and should only perform such a task during low priority situations (e.g., situations that can allow for interruptions). The statistics computation task may have a lower assigned priority than, for example, the data transfer task which carries out the main purpose of the device of transferring data. The task scheduler may thus schedule the statistics task for performance less frequently than the data transfer task. Conversely, the processor may need to perform a fault or exception handling task only occasionally and for only a brief period of time, but when such a task is required, it is essential that the device perform it immediately in response to a condition such as a network fault to prevent a loss of data, interruption of network service or complete device failure. The fault handling task may thus have the highest assigned priority of any task. As such, when a fault occurs that must be handled by the fault handler task, the task scheduler in the operating system will schedule the fault handling task for performance over all other tasks including the data transfer task.

Some implementations of computerized devices provide multiple processors to perform different tasks or groups of tasks at the same time, one task per processor. Other arrangements provide a single processor which is responsible for performing all of the required tasks in the device. In either case, when more than one task can be performed on a processor, prior art task scheduling algorithms generally divide up a total amount of available processing cycles or processor time available on the processing unit between the various tasks that must be performed. This is typically called time slicing or time division multiplexing (TDM). Under the general theory of operation of operating systems that use prior art task scheduler algorithms, each task will execute using a segment of processor time to which that task is assigned. The task scheduler may adjust time segments assigned to tasks based on priorities of those tasks. A common example of a prior art task scheduling algorithm is called the "Round Robin" algorithm. A task scheduler within an operating system that uses round robin generally divides a block of time representing a total amount of available processor time into equal time slices and designates or assigns one time slice to each task that is to be performed. The task scheduler then allows the processing unit to execute the first task during the first time slice. When the task scheduler detects that the first time slice for the first task is complete (i.e., has elapsed), the task scheduler removes the first task from execution and places it at the end of a queue of tasks that are ready to execute and then allows the next (i.e., the second) task to execute during its assigned time slice. This process repeats for each task to be performed, hence the name round robin. A version of the round robin task scheduling algorithm that takes priorities into account may, for example, increase the size of a time slice assigned to higher priority tasks and may decrease the time slices provided to lower priority tasks.

Another prior art task scheduling technique is called "First-In-First-Out" or FIFO. Using FIFO, a task scheduler places tasks that are ready for execution into a FIFO queue. The order in which the task scheduler enters a task determines when that task performs in relation to other tasks. The processor may perform the task at the head of the queue (or the next ready task) until either the task completes, or is blocked for an event such as an input/output interrupt. At that point, the processor begins performance of the next task in the ready queue. Thus in FIFO scheduling, there is no particular fixed time slice or number of cycles for which a particular task is performed.

A third example of a prior art task scheduling algorithm is called "priority based pre-emptive scheduling." In a priority based approach, the task scheduler assigns a relative priority to each task that the processor must perform based upon various factors such as how critical the task is to the operation of the computerized device. The task scheduler generally schedules tasks that are ready to perform based upon the relative task priorities. Thus, if three tasks indicate that they are each available to perform on the processing unit, the priority based task scheduler will generally select the task with the highest priority for performance. The task scheduler may select a task for performance from two or more tasks with equivalent priorities, for example, based on a round robin approach used for multiple tasks that share the same priority. This allows the processor to execute equal priority tasks for equal amounts of time.

In most computer systems, various events can cause a task to be blocked during performance. By way of example, a disk drive experiencing disk latency may cause a task to be blocked while waiting for data. The task scheduler can remove the blocked task from a ready queue or adjust the task's status to "waiting." During the period of blocking, the task scheduler is able to instruct the processor to execute other tasks. When the disk drive is ready with the data for the waiting task, the disk drive processor can signal the processor via an interrupt, for example. The task scheduler can detect this condition and stop the current task from performance in order to have the processor resume performance of the waiting or blocked task by moving it back to the ready queue and setting the task's status to "ready." Priority or pre-emptive scheduling allows tasks to execute based on their priorities and is designed to allow a device to perform tasks of high priority in favor of tasks having lower priorities.

SUMMARY OF THE INVENTION

Prior art implementations of task scheduling algorithms suffer from a number of deficiencies. Generally, these deficiencies arise since system designers typically design and create prior art operating systems for general purpose uses. In other words, the designers employ prior art task scheduling algorithms in computer devices to handle a wide range performance scenarios that can vary from use to use of the particular computer device into which they are incorporated. However, when operating systems employ prior art task scheduling techniques for performance of highly specialized applications and/or in highly specialized or dedicated computerized devices, problems frequently arise.

By way of example, in a data communications device such as a router, switch, hub or the like, the primary task of the device is to transfer data. In a router, for instance, packets arrive on various ports or interfaces and must be transferred through the router to destination ports or interfaces to move the packets along the network towards their destination. While the overall operation of the router may involve a number of different tasks such as maintaining routing tables, error checking, statistics gathering and so forth, the primary task performed by the router involves transferring the data packets from one port or interface to another. Under heavy network traffic conditions where the router must transfer many packets, the priority of the data transfer task must remain very high to keep up with the packet flow in order to avoid network bottlenecks causing delays or lost data. As such, a data communications device employing a prior art task scheduling algorithm schedules the data transfer task ahead of most other tasks. This can cause a situation called "task starvation" in which a processor is unable to execute many lower priority tasks each for a sufficient amount of time to allow each low priority task to effectively perform. Essentially, in situations involving task starvation, during heavy load conditions, the device "starves" lower priority tasks of processor cycles in favor of one or more high priority tasks (the data transfer task in this example). Accordingly, in heavy traffic load situations, a system that allocates a small amount of time to lower priority tasks might be able to properly perform one or two of such non-critical tasks, but when the processor must perform several of such non-critical tasks, each is unable to effectively perform. When a non-critical task cannot perform sufficiently, the output of that task may not be available when required for some other more important task. This can result in a thrashing situation where non-critical tasks that fail eventually begin affecting performance of the critical tasks that rely on their output and therefore the entire system degrades.

Even in task scheduling systems where the device fixes the time quantum or time slice for each task, the number of non-critical or lower priority tasks that must execute can change dramatically in the system. This can result in the data transfer task not having enough time to perform. Also, in situations where the device raises the priority of the non-critical tasks, this can result in the data transfer or packet switching tasks not having enough time to perform. Effects of this can range from packet delays to packet drops because the non-critical tasks are assigned too much time for performance.

The present invention significantly overcomes many of the deficiencies of prior art task scheduling algorithms. More specifically, in one arrangement, the invention provides a method for performing a plurality of tasks of varying priorities in a computerized device. The method is preferably implemented in a yielding scheduler within an operating system in a computing device configured according to the invention. Though examples herein include a data communications device, the invention is applicable to any computing device that performs multiple tasks. The method includes the operations of initiating performance of a first task and then upon occurrence of a first time period, receiving a yield signal initiated by the first task during performance of the first task. The first task may be, for example, a primary task such as a data transfer task in a data communications device. The yield signal, under control of the first task, allows the first task to share processor time with other tasks. In response to receiving the yield signal, the method includes the operations of temporarily disabling performance of the first task and performing at least one second task for a second time period, such that the first task yields performance time to one or more second tasks after the first time period, irrespective of a performance time slice provided to the first task by the computerized device. The second task or tasks may be, for example, lower priority tasks grouped into a non-critical class of tasks. When the first task yield performance time, depending upon the embodiment, just one second task may be performed during the second time period, or more than one second task may be performed during the second time period. Allowing a task to yield time to one or more other tasks is advantageous over conventional systems since the decision to yield processor time is given to the task itself and thus task starvation can be better controlled.

Another arrangement includes the steps of detecting an event indicating expiration of the second time period, and in response thereto, stopping performance of the second task(s) and enabling performance of the first task. This arrangement also includes a step of repeating the steps of performing a first task for the first time period, receiving a yield signal, temporarily disabling performance of the first task, performing at least one second task for the second time period, detecting an event indicating expiration of the second time period and stopping performance of the at least one second task, such that no matter what priorities are assigned to the first and second task(s), each can perform on the processing unit for some time irrespective of a scheduling algorithm used to determine task performance. This can avoid processor starvation situations that are apparent in conventional task scheduling systems.

In another arrangement, the processing unit controls the operation of a data communications device and the first task is a data transfer task designed to transfer data between ports of the data communications devices and the second task is a lower priority task than the data transfer task. Is such an arrangement, the steps of performing the first task for the first time period, receiving a yield signal from the first task, temporarily disabling performance of the first task, performing the at least one second task for the second time period, detecting expiration of the second time period and stopping performance of the second task(s) and repeating allow data transfer operations performed by the first task to take place without starving operations associated with the second task (s).

In yet another arrangement, the step of performing a first task on the processing unit for the first time period further includes, upon the start of performance of the first task, a step of setting an event to occur after an elapsed performance time equal to Y and performing data processing operations associated with the first task. During the step or operation of performing, a step of detecting an occurrence of the event indicating that the performance time Y has elapsed is provided, thus indicating an end of the first time period, and in response thereto, a step of generating the yield signal from within the first task to indicate that the first task is able to yield performance time to another task or tasks is also provided.

In one arrangement, the step of generating the yield signal is performed from within the first task by calling a yield function which then performs on the processing unit. The yield function, when performing on the processing unit, causes the processing unit to perform the step of temporarily disabling performance of the first task.

In yet another arrangement, the step of receiving a yield signal from the first task is performed by a yield function that performs on the processing unit. The yield function, when performed on the processing unit, causes the processing unit to perform the step of temporarily disabling performance of the first task by performing the steps of (i) setting a yield event to detect an elapsed performance time X corresponding to the end of the second time period and (ii) temporarily disabling performance of the first task until the occurrence of the yield event, and (iii) calling a scheduling task in order to schedule performance of another task or tasks during the second time period until the occurrence of the yield event.

In another arrangement, the step of temporarily disabling performance of the first task further includes the steps of dequeuing the first task from a ready queue and setting a status of the first task to a yield condition and enqueuing the first task to a yield queue where it remains until the occurrence of the yield event. This allows other tasks of other priorities in the ready queue to be selected for performance.

In another arrangement, the step of temporarily disabling performance of the first task temporarily disables performance of all tasks having a priority equivalent to the first task thus removing all tasks having a priority equivalent to the first task from a set of tasks available for performance, such that only tasks having a priority that is not equivalent to the first task remain in the set of tasks selectable by the scheduling tasks for performance during the second time period. This is beneficial, for example, in cases where there may be more than one primary (e.g., first) task.

In yet another arrangement, the step of performing the first task is initiated by a scheduler task performing on the processing unit, and the scheduler task, when performing on the processing unit, causes the processing unit to perform the steps of (i) determining if any tasks are available for performance during a task time period determined according to a task scheduling algorithm. If tasks are available, this arrangement performs the steps of selecting a task for performance according to the task scheduling algorithm such that tasks having the first priority that are available for performance are selected for performance over tasks having the second priority that are available for performance, and then performing the selected task for the task time period determined by the task scheduling algorithm. However, also in this arrangement, if it is determined that no tasks are available for performance in the step of determining, then the arrangement performs the step of detecting if any tasks have been temporarily stopped from performance, and if so, the arrangement enables performance of at least one task that has been stopped from performance for the task time period determined by the task scheduling algorithm. Also, the arrangement in this case detects an end of the task time period used to perform a task according to the task scheduling algorithm and repeats the step of determining and detecting.

In other arrangements of the invention, the end of the first time period as determined by the first task occurs before the end of task time period determined by the task scheduling algorithm and the yield signal generated by the first task causes the at least one second task to be performed during the second time period which elapses at least in part in conjunction with the task time period assigned to the first task by the task scheduling algorithm, such that the first task can yield a portion time within the task time period assigned to the first task, as determined by the task scheduling algorithm, to the at least one (i.e., one or more) second task. In other words, the first time period may be a time period Y which occurs concurrently with a time slice assigned to the first task, which may be a primary task. The second time period may be a time period X, that can also elapse in whole or in part during the time slice assigned to the first task by the task scheduling algorithm. One or more second tasks can be performed during the second time period X.

In yet another arrangement, the step of enabling performance of at least one task removes the task from a yield queue and returns the task to a set of tasks available for performance.

Other arrangements based on the above can include the step of classifying each of the plurality of tasks by assigning a priority to each task, such that tasks having the first priority are preferred for performance in the processing unit over tasks having the second priority. In a related arrangement, the first task is a higher priority task and the at least one second task is a lower priority task (or tasks) and the first time period during which the higher priority task performs before yielding performance to a lower priority task is set to be approximately equal to a response time requirement of the lower priority task(s).

In another arrangement, the first task is a higher priority task and the second task(s) are lower priority task(s) and the second time period during which the higher priority task yields performance to a lower priority task is set to be approximately equal to a response time requirement of the higher priority task.

In other arrangements, the first time period is greater than the second time period such that the first task performs longer than the second task(s). In an alternative to this, an arrangement is provided in which the second time period is greater than the first time period such that the second task(s) perform longer than the first task.

In still other arrangements, if the step of initiating performance of a first task initiates performance of a system critical task, the system critical task is performed to completion and is performed with a highest priority of all tasks in the computerized device. This may be the case, for example, where there are three classes of tasks, critical, primary, and non-critical. In such cases, for example, the first task may be a primary task and the second task(s) may be non-critical tasks. In many device and system configurations, critical tasks such as fault handlers are rarely needed, but when they are, they can perform in such arrangements immediately and can perform to completion. In such an embodiment, a critical task may even interrupt the operation of a second task performing during the second time period X. That is, even though the invention allows a first task to yield performance time to one or more second tasks, depending upon the main scheduling algorithm in use (i.e., the scheduling algorithm that originally selected the first task for performance), a critical task might be needed that can interrupt or block any task from performance, and that critical task may be so important to the system that it is allowed to run to completion.

This system of the invention also provides for a method for performing tasks in a data communications device by dividing processor time between the tasks according to a task scheduling algorithm. This method includes the steps of executing at least one data transfer task. The data transfer task generally performs the steps of processing data through the data communications device until an event occurs indicating a time period Y has elapsed. Thereafter, the method includes detecting, from within the data transfer task, that the event indicating the time period Y has elapsed and providing a yield signal from within the data transfer task to the data communications device, the yield signal indicating a time period X in which at least one other task may perform.

In another arrangement, the data transfer task is executed during a task time period allocated to the data transfer task by the task scheduling algorithm, and wherein the event indicating that the time period Y has elapsed is detected by the data transfer task and occurs within the task time period, and, upon the detection of the event, the data transfer task provides the yield signal to yield at least a portion of processor time that occurs during the task time period to at least one other task. The portion generally is not required to exceed the time period X.

Another arrangement includes the steps of executing an operating system task to perform the steps of receiving the yield signal and temporarily disabling performance of the data transfer task. Then, the method selects at, least one other task besides the data transfer task to perform during the time period X and performing that task or tasks for the time period X. Next, upon detecting expiration of the time period X, the method includes enabling performance of the data transfer task and repeating the step of executing at least one data transfer task.

Besides the aforementioned methods, embodiments of the invention include a data communications device comprising a processing unit, a memory system encoded with a plurality of tasks that can perform in the processing unit, and an interconnection mechanism that couples the memory system and the processing unit. In this configuration, the processor performs a first task in the memory system having a first priority, the first task performing for a first time period determined by the first task and upon expiration of the first time period, the first task generating a yield signal. In response to the yield signal, the processor temporarily disables performance of the first task and selects at least one second task for performance and performs the second task in the memory system having a second priority for a second time period, such that the first task yields performance time in the processing unit to the second task(s) irrespective of priorities and scheduling of the first and second tasks.

In another configuration, the processing unit detects expiration of the second time period, and in response thereto, stops performance of the selected second task(s). The processor repeatedly performs the first task for the first time period and in response to the yield signal generated by the first task, temporarily disables performance of the first task and selects and performs at least one second task (e.g., a lower priority task) for the second time period, and detects expiration of the second time period and stops performance of the selected second task(s), such that the first task can control when one or more other selected second task(s) can perform and can provide time for performance of those second task(s) on the processing unit for the second time period by generation of the yield signal.

In another arrangement of the data communications device, the memory system is encoded with a ready queue and a yield queue. When the first task generates the yield signal, the processor removes the first task from the ready queue and places the first task in the yield queue for the duration of the second time period, and upon expiration of the second time period, the processor removes the first task from the yield queue and places the first task in the ready queue such that the first task can be scheduled for performance.

Yet another arrangement of the data communications device includes ports to receive and transmit data. The ports are coupled to the interconnection mechanism. Also, the first task is a data transfer task responsible for processing data through the data communications device using at least one port. The memory system is encoded with an operating system task which controls scheduling of tasks for performance on the processing unit. During performance of the first task, the first task processes data through the data communications device for a time period Y and detects an event indicating the occurrence of the end of the time period Y and in response thereto, provides the yield signal from within the data transfer task to the operating system task (e.g., to a yielding scheduler or yield function within the operating system). The yield signal indicates a time period X in which the selected second task(s) may perform during a task time period assigned by the operating system task to the data transfer task. In a another example embodiment, the one or more second tasks that can perform during the second time period may perform sequentially during the second time period, and are typically of lower priority than the first task. There may be only one such second task, or there may be more than one.

In another arrangement of the data communications device, during conditions of heavy network traffic when the data transfer task is scheduled to perform frequently by the operating system task to ensure that data is processed through the ports of data communications device, the first and second time periods are set such that no matter how frequently the operating system task attempts to schedule the data transfer task, a task or tasks selected as the second selected task(s) can still perform for a period of time equal to the second time period when the yield signal is received from the data transfer task, thus preventing processor time starvation of the second task(s).

In another embodiment of the invention, a method is provided that prevents a task scheduling algorithm from starving lower priority tasks of processor time. The method includes the steps of performing a task scheduling algorithm to schedule a plurality of tasks having varying priorities in a time sliced manner for performance on a processing unit. During performance of a higher priority task in the processing unit, after a first time period, the method includes allowing the higher priority task to generate a yield signal to yield processing time to at least one lower priority task and also includes the step of receiving the yield signal from the higher priority task. In response thereto, the method includes the steps of temporarily disabling performance of the higher priority task and starting performance of at least one selected lower priority task for a second time period, upon the expiration of which, performance of the at least one lower priority task is, stopped and the task scheduling algorithm selects another task for performance.

In another arrangement, the step of temporarily disabling performance of the higher priority task removes the higher priority task from a set of tasks available for performance and uses the task scheduling algorithm to select another task to perform as the second task from the set of tasks available for performance. During the second time period, more than one second task may be performed.

In another arrangement, the higher priority task is a data transfer task for transferring data in a data communications device, and the first and second time periods are dynamically adjustable based on data traffic loads experienced by the data transfer task.

In yet another arrangement, the first time period during which the higher priority task performs before yielding performance to a lower priority task is set to be approximately equal to a response time requirement of the lower priority task(s). Such a response time requirement, may for example, be the minimum response time requirement of the lower priority task(s).

In still another arrangement, the second time period during which the higher priority task yields performance to a lower priority task is set to be approximately equal to a response time requirement of the higher priority task. Such a response time requirement, may for example, be the minimum response time requirement of the higher priority task(s).

Embodiments of the invention also include computer program products such as disks, or other readable media that have a computer-readable medium including computer program logic encoded thereon for scheduling tasks in a computerized device, such that the computer program logic, when executed on at least one processing unit with the computerized device, causes the at least one processing unit to perform any or all of the aforementioned methods.

In another similar arrangement, a computer program product is provided having a computer-readable medium including computer program logic encoded thereon for performing tasks in a data communications device by dividing processor time between the tasks according to a task scheduling algorithm, such that the computer program logic, when executed on at least one processing unit within the computerized device, causes the at least one processing unit to perform above summarized methods.

The methods and arrangements of the invention are preferably implemented primarily by computer software and hardware mechanisms within a data communications device apparatus. The computer program logic embodiments, which are essentially software, when executed on at least one processing unit with the data communications device, causes the at least one processing unit to perform the techniques outlined above, as well as all operations discussed herein that can be performed by software program(s) executing on computer hardware. In other words, these arrangements of the invention are generally manufactured as a computer program stored on a disk, memory, card, or within a prepackaged operating system or other such media that can be loaded into a computer or data communications device to make the device perform according to the operations of the invention.

The features of the invention, as summarized above, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
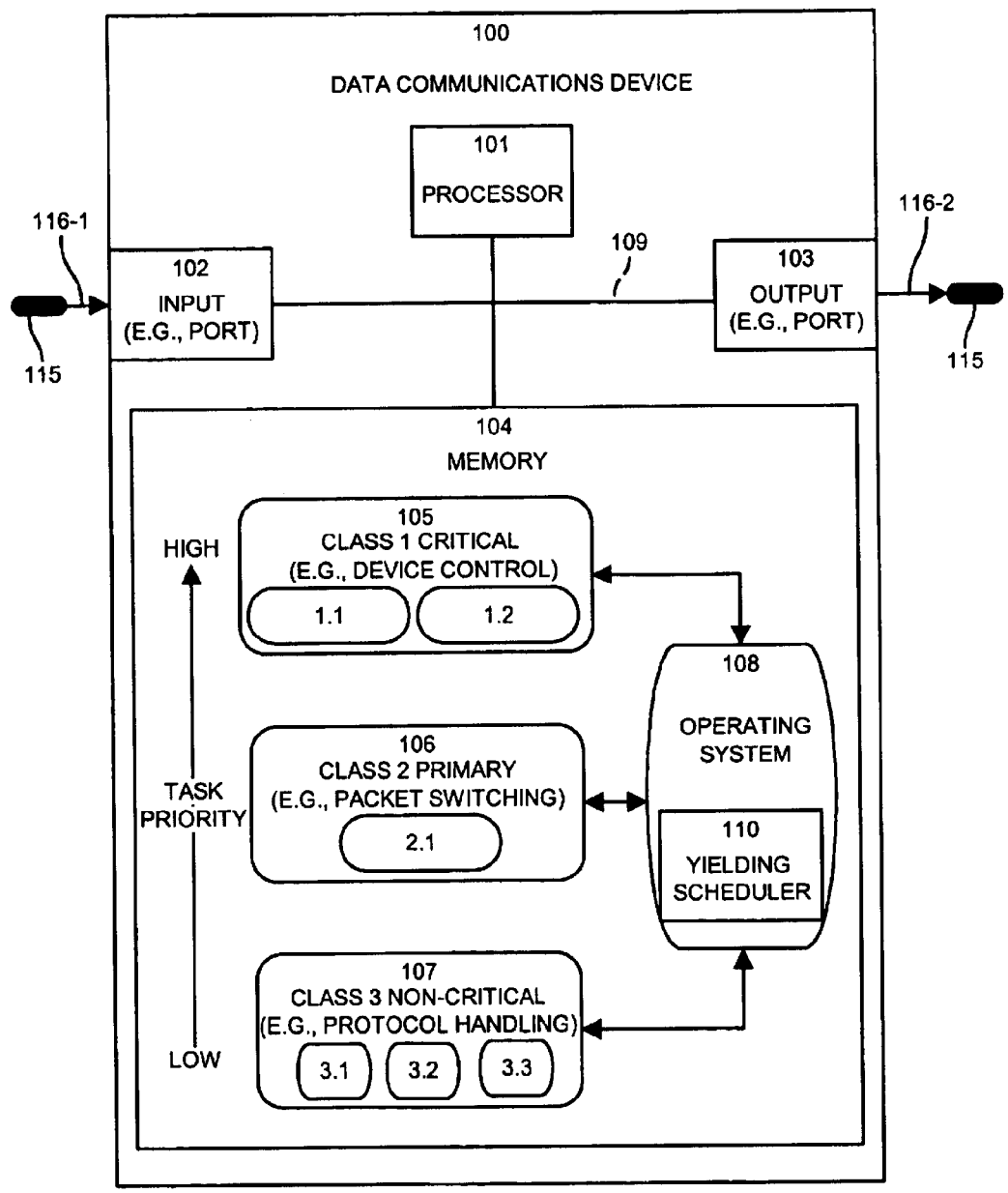
FIG. 1 illustrates a block diagram of an example computer system that schedules tasks using a yielding scheduler configured according to the present invention.

FIG. 1 illustrates an example of a computing device 100 configured according to the invention. In one arrangement, the computing device 100 is a network data communications device such as router, switch, hub, bridge, gateway, network access server or other such device. The computing device 100 includes an interconnection mechanism 109 coupling a processor 100, at least one input interface 102, at least one output interface 103, and a memory 104. Only two interfaces 102, 103 are shown for drawing simplicity and it is to be understood that there may be many interfaces 102, 103. In this example, the interfaces 102, 103 serve as an input and output for data 115 from and to the computer network segments 116-1, 116-2.

The memory 104 in this example stores (e.g., is encoded with) an operating system 108 and various classes 105 through 107 of tasks 1.1, 1.2, 2.1, 3.1, 3.2 and 3.3 that perform on the processor 101. As used herein, the term "task" refers to an entity resident within the data communications device 100, such as a process, program, application, function, procedure, thread, routine, applet or the like that can be performed in the processor 101. The term "perform" means that the task can be executed, interpreted, operated or otherwise run by the processor 101. In a typical implementation of the invention, a task is a process consisting of logic statements (e.g., object code) which the processor 101 can execute. Each task is generally responsible for carrying out one or more related functions or operations. The operating system 108 includes a yielding scheduler 110 that is configured according to this invention to schedule performance of the various tasks 1.1, 1.2, 2.1, 3.1, 3.2 and 3.3 on the processor 101.

Within the memory 104, the tasks 1.1, 1.2, 2.1, 3.1, 3.2 and 3.3 are grouped into various classes 105 through 107. Each class 105 through 107 generally represents a relative priority or level of importance for tasks within that class as compared to other tasks in other classes. For example, tasks 3.1, 3.2 and 3.3 in class 107 (Class 3 non-critical tasks) are, in this example, relatively low priority tasks, while tasks 1.1 and 1.2 in class 105 (Class 1 critical) are high priority tasks that are critical to device operation. Class 106 (Class 2 primary) contains the primary task(s) for the data communications device 100, which in this case is task 2.1. Three classes (i.e., levels of priority) of tasks are shown by way of example only. It is to be understood that the invention is applicable to computing systems that use many more or less tasks and classes and to systems that use some other mechanism(s) beside classes to assign a level of priority or importance to tasks that are to be performed in the system. Moreover, the classes 105 through 107 are drawn for illustrative purposes to show the distinctions between tasks, and do not necessarily represent placement or configuration of the tasks in the memory 104. For instance, in an actual implementation, the class or priority associated with a task may be maintained within a data structure such as a process control block (not shown) associated with that task in the operating system 108.

In this example, the primary task 2.1 is a data transfer task. When the processor 101 performs the task 2.1, the device 100 performs its primary operation of transferring data 115 in packets, cells, frames or the like from a segment of the computer network (e.g. 116-1) coupled to an input interface (e.g., 102), through the data communications device 100 (e.g., over interconnection mechanism 109), and onto another segment of the network (e.g., 116-1) via an output interface (e.g. 103). If the device 100, for example, is a router in a packet-based network such as the Internet, the primary task 2.1 may be a packet switching task used to transfer data packets 115 through the device 100 over the network 116. The data transfer task 2.1 may require certain performance time constraints (e.g., must be performed at least every N milliseconds, for a duration of M milliseconds) so that delay sensitive data packets 115 containing, for example, real-time voice, video or other important data can be processed to maintain a certain Quality of Service or bandwidth level through the device 100, and/or so that data packets 115 are not dropped due to arrival buffer overflows within the input port(s) 102. Such time constraints may vary based on current levels of data traffic present within a network.

The remaining tasks 1.1, 1.2, 3.1, 3.2 and 3.3 are responsible for providing various other operations within the data communications device 100. For example, critical tasks 1.1 and 1.2 (in Class 1 Critical) may be device control tasks such as fault or interrupt handlers that only require a short amount of performance time on the processor 101 but that are critical to the overall continued operation of the device 100. When the device 100 requires the performance of either critical task 1.1 or 1.2 (e.g., in response to certain critical interrupts), a higher level of importance or priority is placed on these tasks (1.1, 1.2) than any other task and the processor 101 must perform such tasks immediately to ensure proper continued operation.

In a preferred embodiment, critical tasks such as tasks 1.1 and 1.2 are generally not scheduled per se using a general time slicing algorithm (to be explained). Rather, they are required in the event of special situations such as a fault. Thus, if a critical task needs to perform, it may preempt any task currently performing (e.g., may stop the primary task 2.1). Moreover, in such an example embodiment, critical tasks such as 1.1 and 1.2 are generally so important to the continued operation of the device 100 that they are also allowed to fully complete performance. In other words, they can preempt any lower priority class 2 or 3 task and once started they can perform until they complete their job. Generally, such critical tasks are only occasionally required and when needed, only require a small amount of performance time.

Conversely, non-critical tasks 3.1, 3.2 and 3.3 (in Class 3 Non-Critical) may be computationally intensive tasks that perform, for example, periodic routing table updates, statistics gathering or other ancillary background functions. When the processor 101 performs tasks 3.1, 3.2 and 3.3, they may consume and/or require a reasonable amount of time (i.e., processor cycles) to fully perform. However, the data communications device 100 may only require performance of such tasks periodically. While tasks 3.1, 3.2 and 3.3 are generally non-critical to the basic packet-by-packet data transfer operation (task 2.1) in the data communications device 100, the processor 101 must still periodically perform these tasks in order to keep the state of the device 100 up-to-date with current network conditions. Thus, even in heavy network traffic conditions when the device must frequently perform the primary data transfer task 2.1 to handle large numbers of data packets 115 (e.g. arriving at input interface 102), the non-critical tasks (3.1, 3.2 and 3.3) may require certain minimal or maximum response time requirements as well. Such requirements, however, may be considerably less stringent than the requirements of the tasks in the critical and primary classes 105 and 106.

Generally, the operating system 108 oversees and controls the operation of the data communications device 100. Within the operating system 108, the yielding scheduler 110 implements a general task scheduling algorithm (not specifically shown in FIG. 1) to cause the processor 101 to perform the various tasks 1.1, 1.2, 2.1, 3.1, 3.2 and 3.3 in classes 105 through 107 as they are required. For purposes of this invention, the particular choice of general task scheduling algorithm is not critical to the operation of the invention. Preferably, the yielding scheduler 110 implements a priority-based task scheduling algorithm that selects various tasks to perform for selected assigned time periods or time slices based on their readiness to perform and on their relative priorities (e.g., classes) to each other.

Since the primary purpose of the data communications device 100 is to transfer data, the data communications device 100 often requires performance of the packet switching task 2.1. As such, the yielding scheduler 110 uses the task scheduling algorithm to cause the processor 101 to perform the primary task 2.1 (e.g., packet switching) on the processor 101 most of the time. Under heavy network load conditions, the yielding scheduler 110 may allocate many cycles of the processor 101 to the primary data transfer task 2.1 such that, without some form of intervention, other tasks, such as non-critical tasks 3.1, 3.2 and 3.3, may not be allocated enough cycles to properly perform. In other words, if just a conventional priority-based task scheduling algorithm 114 alone were used, heavy network conditions might demand that the yielding scheduler 110 assign the data transfer task 2.1 much of the available cycle time on processor 101, thus leaving little remaining processor time for other tasks.

According to the invention, however, irrespective of the general task scheduling algorithm provided by the yielding scheduler 110, a task that is currently performing (e.g., the primary data transfer task 2.1) for a first time period is able to generate a yield signal (not shown) to yield processing time to other tasks, such as the less-critical tasks 3.1 and/or 3.2 and/or 3.3 in non-critical class 107. The yielding scheduler 110 is configured to recognize and receive the yield signal from the primary task 2.1 in this example. In response to receiving the yield signal, the yielding scheduler 110 temporarily disables performance of the first or primary task 2.1 and instead performs at least one other task, such as one or more lower priority tasks 3.1, 3.2 and/or 3.3, for a second time period. The primary task 2.1 can thus yield performance time to either the task 3.1, 3.2 or 3.3 (or all of these tasks or a combination thereof) after the first time period (i.e., a first period of time in which task 2.1 has performed), irrespective of a performance time slice provided to the: primary task 2.1 by the task scheduling algorithm operating in the yielding scheduler 110 in the data communications device 100.

The invention is thus generally embodied in this example as mechanisms within the primary task 2.1 that can provide the yield signal to the yielding scheduler 110 after a first period of performance time, as well as a mechanisms within the yielding scheduler 110 to detect the yield signal and to perform at least one other task for a second prescribed period of yield time in response to receiving the yield signal. After the non-primary process(es) perform for the yield time, the yielding scheduler 110 can resume its normal operation of scheduling tasks. In most cases; the yielding scheduler 110 will thereafter again resume performance of the primary data transfer task 2.1, though this need not be the case in all circumstances. Typically, the task or tasks that are performed during the second time period (i.e., the tasks performing during "yielded" time) are lower in priority (e.g., class 3 tasks) than the primary task (e.g. task 2.1) which yielded the time.

The above example thus illustrates how the data communications device 100 configured in accordance with this invention can give special attention (i.e., high priority) to the packet forwarding or data transfer task 2.1 without causing starvation of other tasks. By carefully selecting time periods, as will be explained, for (i) the amount of time Y that the primary data transfer task 2.1 performs before providing a yield signal to yield processor time to another task, and (ii) the amount of time X yielded to other tasks (called the "yield time"), the system of the invention can allow the data communications device 100 to achieve deterministic but dynamic weighted fair scheduling of tasks on the processor 101 with negligible performance penalties. In other words, the invention allows more balanced task performance to be achieved in the data communications device 100.

Figure 2:
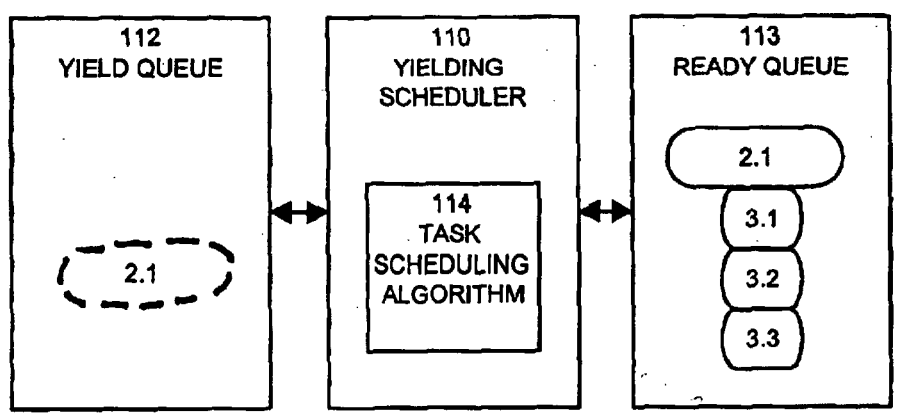
FIG. 2 illustrates how the yielding scheduler configured according to the present invention can use a yield queue and a ready queue to manage tasks that yield processor time to other tasks.

FIG. 2 illustrates a block diagram of the yielding scheduler 110 including a task scheduling algorithm 114 configured to interoperate with two task queues: a yield queue 112 and a ready queue 113. The yield queue 112 maintains tasks that have generated a yield signal and that are in a state of "yielding" processor cycles to another task. In a preferred embodiment, the primary data transfer task 2.1 is equipped with the yield feature of this invention and when this task 2.1 is in a state of yielding time to other tasks (e.g., lower priority tasks), the primary data transfer task 2.1 is placed in the yield queue 112 as illustrated by the dotted outline of task 2.1 in the yield queue 112 in FIG. 2. The ready queue 113 is used to maintain tasks that are ready to perform on the processor 101 (e.g., that are not waiting for events or data). The task scheduling algorithm 114 selects a task to perform on the processor 101 from the tasks that are available for performance as listed in the ready queue 113. As indicated above, the task scheduling algorithm 114 can be, for example, a well-known priority preemption CPU scheduling function used to schedule cycles of the processor 101 among the various tasks ready to perform (i.e., that exist in the ready queue 113) from the three classes of tasks 105 through 107. In this example, tasks 2.1, 3.1, 3.2 and 3.3 are each ready to be performed. Note that tasks 1.1 and 1.2 are not in the ready queue 113. Perhaps these tasks 1.1 and 1.2, which are fault handling tasks in this example, are not required at this time, or as noted above in an example embodiment, are not generally scheduled along with other tasks but merely preempt any task when needed.

Figure 3:
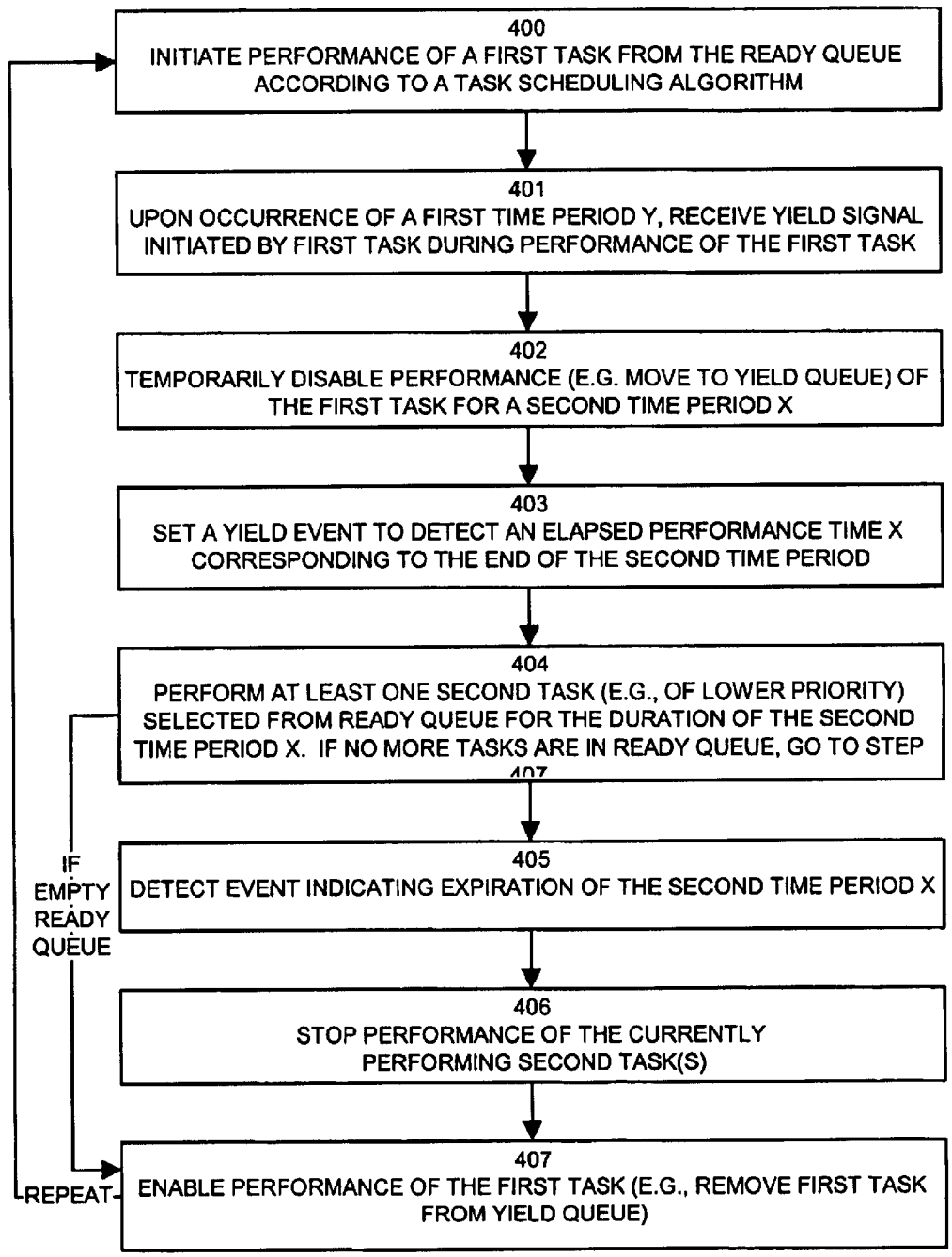
FIG. 3 is a flow chart of processing steps generally performed by embodiments of the invention to allow a task to yield processing time to other tasks.

FIG. 3 illustrates a flow chart of processing steps for the overall operation of the arrangement illustrated in FIG. 2. In operation of this arrangement, the yielding scheduler 110 in step 400 (FIG. 3) initiates performance of a first task from the ready queue 113 according to the task scheduling algorithm 114. Generally, performance of a new task is started at the beginning of a time slot or processor cycle time slice computed according to the task scheduling algorithm 114. The yielding scheduler 110 might perhaps always select a task with the highest priority in the ready queue 113, which in this example is the data transfer task 2.1. If two tasks within the same class of priority are available (e.g., if another task having the same priority or class as the primary task 2.1 is in the ready queue 113), then a fair method of task selection such as round robin can be used to select between equal-priority tasks at different time slices for tasks of the same class. Once initiated, the data transfer task 2.1 in this example performs on the processor 101 to process data packets 115 (FIG. 1) through the data communications device 100.

In step 401, after a first period of time Y has elapsed in which the data transfer task 2.1 performs, the yielding scheduler 110 receives a yield signal initiated by the data transfer task 2.1. The yield signal may be generated from the data transfer task 2.1 as follows: As the processor 101 performs the data transfer task 2.1, the data transfer task can, for example, keep an internal timer, set an interrupt or an event, or use another mechanism to detect an elapsed time Y. Time Y is an amount of time during which the task 2.1 performs, at its discretion, on the processor 101 before yielding time to other tasks. The specific length of time period Y is the topic of a more detailed discussion presented later. Upon the occurrence of the event, interrupt or other internal task time detection mechanism indicating the lapse of performance time Y in the task 2.1, the task 2.1 can then generate the yield signal, for example, by calling a function, generating a yield interrupt, calling an operating system task or by using another inter-process or inter-task communication mechanism to provide an indication of the yield signal to the yielding scheduler 110.

Note that in certain embodiments of the invention, the generation of the yield signal and the tracking of time period Y leading up to the yield signal generation are completely up to the task 2.1. In other words, the primary task 2.1 provides these mechanisms internally to the task 2.1 itself, and they are not under control of the yielding scheduler 110.

In response to receiving the yield signal, in step 402 the yielding scheduler 110 temporarily disables performance of the data transfer task 2.1 for a second time period X. Generally, the second time period X, called the "yield time," is the amount of time that the first task (the data transfer task 2.1 in this example) gives up or "yields" to another task such as one or more lower priority tasks. In step 402, the yielding scheduler 110 can temporarily disable the performance of the data transfer task 2.1 by placing or moving the data transfer task 2.1 from the ready queue 113 to the yield queue 112, as illustrated in FIG. 2 (the yield queue 112 containing the task 2.1). While a yield queue 112 is used in this example to illustrate that the yielding scheduler 110 disables performance of the task 2.1, other mechanisms can be used for this purpose as well. For instance, the yielding scheduler 110 might place the primary data transfer task 2.1 into a yield state within the ready queue 113 when that task 2.1 generates the yield signal indicating the task is willing to yield time to another task. In an alternative embodiment which will be explained later, to disable performance of the task 2.1, the yielding scheduler 110 might temporarily lower the priority of the data transfer task 2.1 to a level that is lower than other tasks thus causing the task 2.1 to, be a non-viable choice for task performance selection based on its lowered priority.

Once the yielding scheduler 110 disables performance of the primary task 2.1 (via placement in yield queue, state or status change, temporary adjustment of priority, etc.), in step 403 the yielding scheduler 110 can set a yield event to detect the second elapsed yield time period X. As indicated above, the second time period X, or yield time, represents an amount of time in which other tasks can execute before the task in the yield queue 112 (e.g. task 2.1) is moved back to the ready queue 113 (i.e., has its performance re-enabled).

In step 404, the yielding scheduler 110 again selects another task from the ready queue 113 for performance on the processor 101. For instance, one or more of the tasks 3.1, 3.2 and/or 3.3 may be selected for performance during the yield time period X. Perhaps task 3.1 is first selected in this example, to be followed by task 3.2 and then task 3.3 if there is yield time "left over." Also in this step, the processor 101 performs the selected second task 3.1 typically for the duration of the second time period (yield time) X. However, it may perhaps be the case that task 3.1 may not consume or require all of the "yield" time X in which case yield time will remain during which another of the selected tasks such as task 3.2 may perform. If there are no more tasks in the ready queue 113 which are available for performance during the yield time period, then step 407 is processed as will be explained shortly. To this end, step 404 allows the processor 101 to perform one or more tasks such as task 3.1 (and possibly 3.2 and/or 3.3 if yield time remains after 3.1 either completes or is blocked from some reason) during the yield time X. Such tasks (e.g., 3.1 and 3.2) may be performed sequentially during time period X or concurrently within that time period.

In this manner, yield time X elapses at the same time (i.e., concurrently) as does a portion of the time slice or time slot assigned to the primary data transfer task 2.1 by the task scheduling algorithm 114. In other words, when the data transfer task 2.1 generates the yield signal after the first time period Y, one or more second tasks (e.g., 3.1 and possibly 3.2 in this example) are able to execute in its place for the yield time period X. All of this may occur within one or more time slices allocated to the data transfer task 2.1 by the task scheduling algorithm 114.

In step 405, the yielding scheduler 110 detects an event indicating expiration of the second time period X, during which the second selected task or tasks were able to perform on the processor 101. Such second task or tasks are typically lower in priority than the primary task 2.1. In response thereto, in step 406, the yielding scheduler 110 stops performance of the lower priority task or tasks 3.1, 3.2 and 3.3 (as selected and performed during the yield time X as explained in step 404). In step 407, the yielding scheduler 110 re-enables performance of the data transfer task 2.1. The yielding scheduler 110 may re-enable performance of the primary data transfer task 2.1 by moving it from the yield queue 112 back into the ready queue 113, for example, or may simply adjust a status associated with the task 2.1 from "yielding" to "ready." After step 407 is complete, the yielding scheduler 110 returns to process step 400 where the entire set of steps 400 through 407 is repeated.

In this manner, the system of the invention generally allows a task to perform for a time period Y, and then, at its discretion (and not at the discretion of the task scheduling algorithm 114) give up some of its assigned processor cycles to another task or tasks (for example to one or more lower priority tasks) for a yield time period X. After the yield time period X has expired, the system stops performance of the lower priority task or tasks and re-enables the task (preferably the primary task of the device such as task 2.1 in the example) that yielded the time for performance and uses the task scheduling algorithm 114 to select a new task to perform on the processor 101.

In the previous example, when heavy network load conditions are present, the task scheduling algorithm 114 in the second occurrence of step 400 may again select the primary data transfer task 2.1 for performance when step 400 is repeated. Alternatively, it may perhaps be the case that other tasks have since entered the ready queue 113 and are thus available for performance. Suppose that the system triggers task 1.1 for performance due to a system fault that occurs. In this instance, the yielding scheduler 110, via the task scheduling algorithm 114, may select task 1.1 in step 400 over all of the other tasks due to its high priority. Note however that in a preferred embodiment of the data communications device 100, only the primary data transfer task 2.1 would be configured with the ability to generate the yield signal. Thus, when the processor 101 performs other tasks besides primary task 2.1 in normal operation of device 100 according to the task scheduling algorithm 114, the invention is not used since these other tasks (tasks besides the primary task 2.1) do not provide a yield signal to the yielding scheduler 110. To this end, the yield signal and the actions of the invention which follow therefrom are a sort of "out-of-band" mechanism given, in this embodiment, to the primary data transfer task 2.1 to avoid problems such as task starvation that might be encountered if all task performance were left completely up to the task scheduling algorithm 114. In other words, this embodiment gives power to, a task itself to schedule other tasks by yielding its own processor time, at its discretion.

Depending upon the use and configuration of a device that employs this invention, critical tasks (which were the highest priority in the former examples) may have the same priority as, for example, the primary task. In this case, the portion of the invention that provides the ability of a task to yield time can be implemented within all tasks of the same class or priority. In other words, the invention could be implemented within all tasks of the same class such that in the event there is more than one task of the same priority or class (e.g., a critical and primary have same priority or many primary tasks, etc.), none of the tasks in that class would allow the main scheduling algorithm to starve the lower priority tasks since each task would be equipped with the ability to yield processor time.

The repetition of steps 400 through 407 occurs in a manner as explained above, over and over, such that no matter what priorities are assigned to any of the tasks, each performs on the processor 101 for some amount of time irrespective of the task scheduling algorithm 114 that is used to generally schedule tasks. In other words, the invention can be used to prevent task or process starvation conditions since the primary task 2.1 that might be scheduled to run quite often by the task scheduling algorithm 114 can chose to pre-empt itself via the yield signal to allow other tasks to perform in its place for the time period specified by X.

In the above described example, only the task 2.1 in class 2 needs to perform the time yield operation, as class 1 critical tasks such as tasks 1.1 and 1.2 can pre-empt any task from performance, including the primary task 2.1. If there were more than one primary task, such as a task 2.2 (not shown), then the other primary tasks in class 2 would also preferably implement the time yield operation as explained herein so that none of the class 2 primary tasks (in the case that there is more than one) would be able to starve lower priority tasks of processor time.

Figure 4:
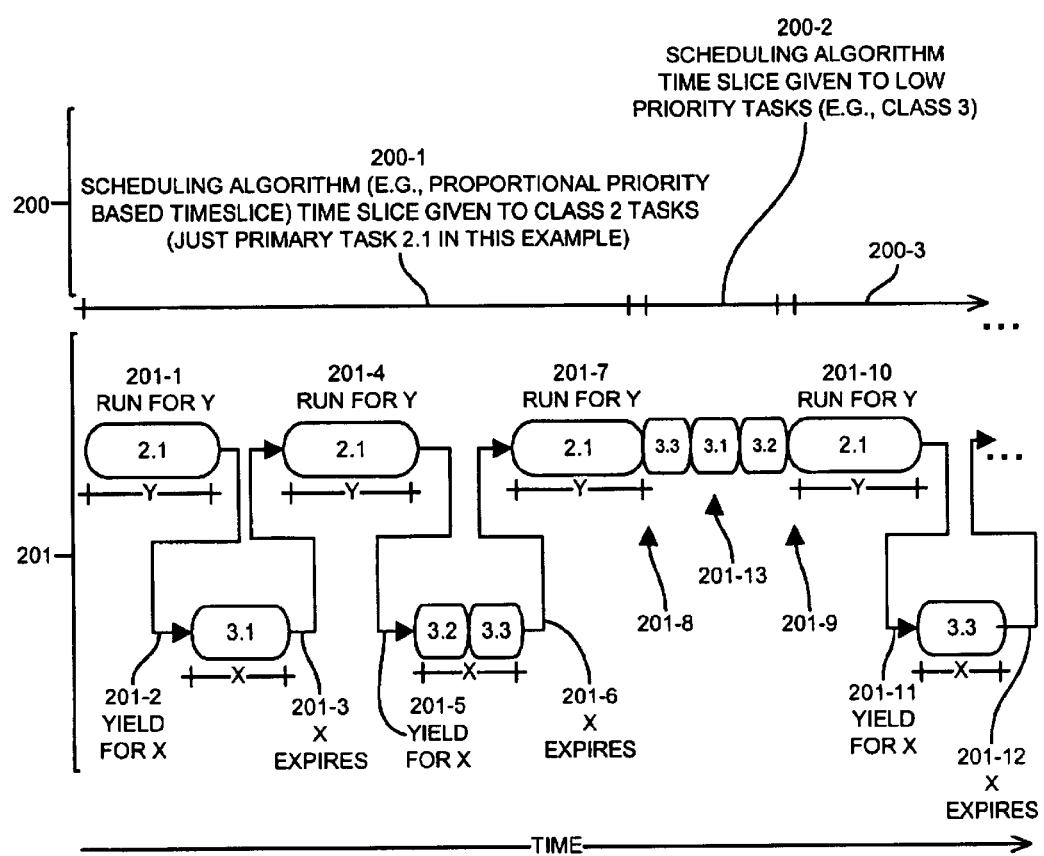
FIG. 4 illustrates a performance comparison between a primary task that performs according to a scheduling algorithm and other tasks that are provided yield time in which to perform according to this invention.

FIG. 4 illustrates an example time line showing performance of various tasks in a computing device configured in accordance with the invention. As will be explained, this figure demonstrates how the invention can be used to allow other tasks to perform irrespective of how the task scheduling algorithm 114 assigns such others tasks for performance on the processor 101. In FIG. 4, time progresses from left to right. The upper time line 200 represents the time slots or time slices (200-1 through 200-3) provided by the task scheduling algorithm 114 for task performance. In this particular example, the general task scheduling algorithm 114 is illustrated in portion 200 of the figure and uses a proportional priority based time slice assignment scheme to assign time slices to class 2 primary processes (i.e., task 2.1) as well as assigning a somewhat smaller time slice 200-2 for performance of class 3 non-critical tasks such as tasks 3.1, 3.2 and 3.3. The task scheduling algorithm 114 assigns larger time slices 200-1 and 200-3 to the primary task 2.1 in class 106 (the data transfer task 2.1 in the example) due to the fact that task 2.1 has a higher priority since it performs the main operation of transferring data packets 115 through the data communications device 100. The task scheduling algorithm 114 assigns the remaining cycles of processor 101 to time slice 200-2 for performance of all other tasks (e.g., task 3.1, 3.2 and 3.3 from ready queue 113 in FIG. 2). Time slice 200-2 may be insufficient to allow the other required tasks to properly fully operate as required for continued long term operation of the data communications device 100.

It is to be understood that other task scheduling algorithms 114 besides the proportional priority based time slice example shown as time line 200 in FIG. 4 can be used within the context of the invention. For example, a priority pre-emptive scheduling arrangement can be used that provides general time slicing (e.g., slices 200-1, 200-2, 200-3) only among equal priority tasks. The example here uses proportional priority based time slicing in order to illustrate time slices provided to tasks of different priorities (classes 2 and 3 in this example). This allows the figure to illustrate how lower priority tasks that are still provided with their own time slice can still be starved of processor time (see slice 200-2 in FIG. 4 in which tasks 3.1, 3.2 and 3.3 each try to perform to little avail) if only the proportional priority based algorithm were used with the invention as illustrated in this example generally by the reference 201 in FIG. 4.

That is, the system of the invention, as generally explained above, provides the operations that occur within the lower time line 201. Time line 201 includes: (i) time slices 201-1, 201-4, 201-7 and 201-10 that represent the Y time periods during which the primary data transfer task 2.1 performs on the processor 101; (ii) events 201-2, 201-5 and 201-11 which indicate both the yield signal the start of the yield time period X (labeled "YIELD FOR X"); and (iii) events 201-3, 201-6 and 201-12 which indicate the expiration or end of the yield time period X (labeled "X EXPIRES").

Beginning on the left of the time lines 200 and 201, the task scheduling algorithm 200 assigns time slice 200-1 to the primary data transfer task 2.1 and the processor 101 begins performance of this task (step 400 FIG. 3). The processor 101 performs or "runs" task 2.1 for the time period Y 201-1, as measured, in a preferred embodiment, using mechanisms (e.g., events, interrupts, internal timers, and so forth) within the task 2.1. Alternatively, the task 2.1 can start the time period Y via a signal for example, to a timer (not shown) within the operating system 108, and when the timer expires, the operating system 108 indicates this expiration to task 2.1. In any event, an important aspect of this embodiment is that the task 2.1 itself initiates and governs the time period Y 201-1. Upon the expiration of time period Y 201-1, the primary task 2.1 generates or sends the yield signal (shown as event 201-2) to the yielding scheduler 110 in order to yield processor cycles for a time period X. Note that in this example, the first time period Y during which task 2.1 performs is only a fraction of the entire time period or slice 200-1 provided to the task 2.1 by the general proportional priority based time slicing task scheduling algorithm 114.

When the yielding scheduler 110 receives the yield signal (event 201-2 and step 401 in FIG. 3), the yielding scheduler 110 performs the following operations: (i) temporarily disables performance of task 2.1 (Step 402 FIG. 3); (ii) sets the yield event (201-3) to expire at the end of the yield time period X (Step 403 in FIG. 3); (iii) selects at least one another task to perform (task 3.1 in this first example at location 201-2) (Step 404 in FIG. 3); and (iv) starts performance of the task 3.1 on the processor 101 (also Step 404 in FIG. 3) for the duration of the yield time period X (the time between 201-2 and 201-3).

When the yield time period X expires at location 201-3 in the time line 201, the yielding scheduler: (i) detects this event 201-3 indicating the expiration of the yield time period X (Step 405 in FIG. 3); and (ii) stops performance of the task 3.1 (Step 406 in FIG. 3 and location 201-3 in time line 201 in FIG. 4). The yielding scheduler 110 then re-enables performance of the primary task 2.1 (Step 407 in FIG. 3, also at location 201-3 in FIG. 4), for example, by moving it from the yield queue 112 to the ready queue 113 as explained with respect to FIG. 2, or by adjusting its status to "ready". Then, the yielding scheduler 110 can return to step 400 (FIG. 3) to initiate performance of another task via the task scheduling algorithm 114. Since the task scheduling algorithm 114 can then determine at location 201-3 that the time slice 200-1 for task 2.1 has not yet expired, the yielding scheduler 110 can again select task 2.1 for performance (and can initiate task 2.1) on the processor 101, assuming no other high priority task has since been placed in the ready queue 113. That is, if no other task of equal or higher priority than task 2.1 enters the ready queue 113 at any time during or at the end, of the yield state (the duration of time X) in which task 2.1 is disabled and another task is able to perform, when the yield state ends and the yielding scheduler 110 moves task 2.1 back to the ready queue 113 and then attempts to select another task for performance, task 2.1 will be selected as it is again the highest priority task in the ready queue 113. In other words, if there were multiple primary tasks (e.g., 2.1 and 2.2), and while task 2.1 was yielding time to task 3.1 at location 201-2, task 2.2 were placed in the ready queue, then when the time period X expires at point 201-3, either task 2.1 would be resumed or task 2.2 might be selected for execution. Also, it is to be understood in this particular embodiment that if tasks 1.1 or 1.2 are required for performance due to a fault for example, the operating system 108 can immediately preempt any task during performance in time periods X or Y, and once started, such a high priority class 1 task would be allowed to perform to completion.

In this example however, only one primary task 2.1 is available for performance. As such, the processing of the invention then repeats itself as the primary data transfers task 2.1 performs for the time period Y between locations 201-3 and 201-5. At location 201-5, the, time period Y has again expired as detected internally by task 2.1 and the task 2.1 yields more processor time to at least one other task via the yield signal (also represented by 201-5). At this location 201-5, the yielding scheduler 110 then first selects task 3.2 to perform. This may be due, perhaps, to the fact that tasks 3.2 and 3.3 were available in the ready queue 113 and task 3.1 completed its required processing between locations 201-2 and 201-3 in FIG. 4.

Accordingly, since the yielding scheduler 110 formerly selected task 3.1 at location 201-2 to perform during the first occurrence of the first yield time X, the yielding scheduler 110 can use a fair task selection mechanism such as round robin to select another task of the same priority (if one or more other such lower priority task exists, e.g., 3.2 and/or 3.3) to perform during the next or second yield time period X between locations 201-5 and 201-6. As in this example, task 3.2 is initially selected. Also as illustrated in this example, task 3.2 only performs for a short amount of time within the X time period between locations 201-5 and 201-6. As such, since task 3.2 did not require the full amount of time in the time period X, task 3.3 is selected to "use up" the remainder of the yielded time. This is illustrated in FIG. 4 by having both tasks 3.2 and 3.3 perform for a portion of the time period X between locations 201-5 and 201-6. In other words, if task 3.2 completes before X expires, the system of the invention can select and perform task 3.3 assuming that task 3.3 is awaiting performance in the ready queue 113. After the second yield time X expires at location 201-6, task 2.1 is again re-enabled for performance and the task scheduling algorithm 114 resumes performance of task 2.1 one final time during the time slice 200-1 until the task scheduling algorithm 114 detects the end of the time slice 200-1.

Then, at location 201-8, the time slice 200-2 provided to other tasks (of lower priority in this example) by the task scheduling algorithm 114 is started and the task scheduling algorithm 114 causes another task from the ready queue to be performed. Recall that the task scheduling algorithm 114 reserves time slice 200-2 for other tasks besides the primary data transfer task 2.1. In this particular example, it just so happens that tasks 3.1 through 3.3 are each ready to perform and the most recently performed task 3.3 in this class (class 3 non-critical) during the yield time X is again selected by the task scheduling algorithm 114 to perform during time slice 200-2. When the task 3.3 completes and there is still time remaining within time slice 200-2, the scheduler 110 uses round robin to select another task of class 3 for performance. In this case, task 3.1 is again performed and again completes as shown at location 201-13. Since there is still some time remaining in the time slice 200-2 dedicated to class 3 tasks, the scheduler again uses round robin to select and perform task 3.2 until time slice 200-2 expires. At this point, the task scheduling algorithm 114 enters into time slice 200-3 and again selects task 2.1 to perform at location 201-9. The remaining portions of the time lines 200 and 201 in FIG. 4 operate generally as explained above.

It is to be understood that variations on the above operation are possible and contemplated as being within the scope of this invention. In the illustrated example in FIG. 4, more than one task may selected and scheduled to be performed in time period X, as shown between time line locations 201-5 and 201-6. In this example, if there is enough time in time period X to perform multiple class 3 tasks, then round robin was used to select between such tasks that are ready for performance. Alternatively, an embodiment is provided that returns processing to the primary task if the first task scheduled to perform during time period X completes or is otherwise blocked from performance. In this alternative configuration, at time line location 201-5 for example, when task 3.2 begins performance and completes, task 3.3 would not be performed. Instead, time period X would expire "early" and processing would revert back to task 2.1 at point 201-7. The figure however illustrates how the invention can perform two or more tasks during the yield time period X.

As discussed briefly above, the choice of values or the determination of the time periods X and Y can have a significant impact on how the invention effects performance of the various tasks in the data communications device 100, or in any computing system in which the invention is implemented. In a preferred embodiment, values for time periods X and Y are determined by system overheads such as task context switching overhead. As a goal, X-minimum and Y-minimum (the minimum values for X and Y) can be chosen to keep overhead around one percent of processor utilization. In addition, X-minimum should allow enough rate of forward performance or progress of non-primary or non-critical tasks (e.g., 3.1, 3.2). Y-minimum should allow the data transfer task 2.1 to perform at least long enough to service all input interfaces 102 as well as, for example, to allow the data communications device 100 to pull all packets out of any hardware interface queues (not shown in figures) and process some number of packets. Preferred embodiments use the highest possible values for X and Y since the context or task switching overhead is minimized in this manner.

Embodiments of the invention can provide for upper bound limits on values for X and Y as well. For instance, the system can determine the upper bound on the time period X in one embodiment by the response time requirements of the data transfer task 2.1. If the data communications device 100 is a router handling voice and/or video data traffic, X-maximum can be selected to be at most the maximum allowed packet delay. The system can also select X-maximum to be small enough so that the data transfer task 2.1 can perform sufficiently to avoid a situation where hardware interface queues (not shown) in the input interfaces 102 fill up with data packets 115 thus causing the data communications device 100 to begin dropping packets. Also, the yielding scheduler 110 can select X-maximum to be small enough so that data packets 115 waiting to be transmitted in the output interfaces 103 are handled by the system of the invention in a timely manner to avoid starvation of service to the output interfaces' 103 by the data transfer task 2.1 causing loss of throughput. The upper bounds on the time period Y may be, for instance, imposed by the response time requirements of the class 3 tasks such as task 3.1 and 3.2. The system can set Y-maximum in this instance to the minimum response time constraints placed on class 3 tasks.

In certain embodiments of a data communications device configured in accordance with the invention, the primary task 2.1 will frequently perform until the time period Y (e.g., the time of locations 201-1, 201-4, 201-7 and 201-10 in FIG. 4) is reached during high data network traffic conditions since the system will schedule this task so often. During low traffic conditions when the network 116 is relatively idle, the data transfer task 2.1 may not need all of the cycles that the task scheduling algorithm 114 assigns in time slices 200-1, 200-3, and so forth (FIG. 4) since the task 2.1 will be merely waiting for packets 115 to arrive at input interfaces 102. In such low-traffic circumstances, it might be proper to let the data communications device 100 perform other tasks such as tasks 3.1 and/or 3.2 more frequently. In other words, the non-critical or non-primary tasks could be allowed to consume more X cycles, in which case X might be made larger in light network traffic conditions. As another example, when non-critical tasks such as tasks 3.1 and 3.2 do not require much processor time (i.e. in situations where they are only very rarely required and have just been recently fully performed), the data transfer task 2.1 could be allowed to have a larger Y time period and X might be made smaller.

Figure 5A:
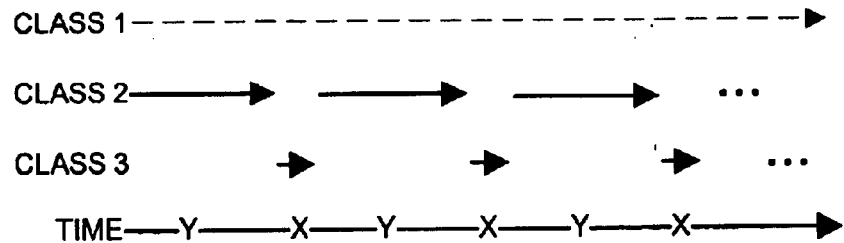
FIG. 5A is a chart illustrating comparative performances of tasks when a time Y, which represents a time a primary process is able to run before yielding, is greater than a time X, which represents the amount of yielded processor time given up to one or more other processes.
Figure 5B:
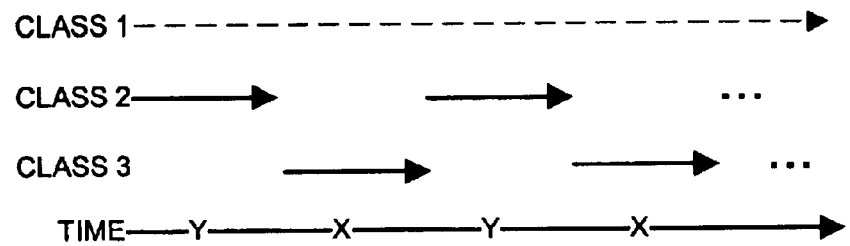
FIG. 5B is a chart illustrating comparative performances of tasks when a time Y, which represents a time a primary process is able to run before yielding, is equal to a time X, which represents the amount of yielded processor time given up to one or more other processes.
Figure 5C:
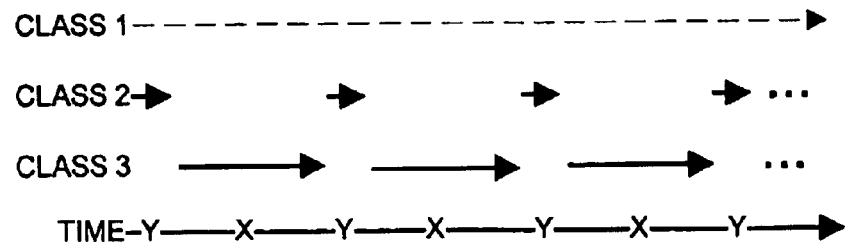
FIG. 5C is a chart illustrating comparative performances of tasks when a time Y, which represents a time a primary process is able to run before yielding, is less than a time X, which represents the amount of yielded processor time given up to one or more other processes.

FIGS. 5A, 5B and 5C further illustrate these principles. Generally speaking, as shown in FIG. 5A, if the value of Y is set high or greater than X which is set low, the data communications device 100 will perform class 2 tasks (e.g., task 2.1) and transfer data packets 115 more aggressively at the expense of the response time of lower priority class 3 tasks (e.g., 3.1, 3.2). For instance, if Y=9X, then for the time slices 200-1, 200-3, etc. assigned by the task scheduling algorithm to the primary data transfer task 2.1, ninety percent will be used by the data transfer task and the remaining ten percent will be yielded to other tasks, such as class 3 tasks 3.1 and 3.2. Conversely, as shown in FIG. 5C, if the value of Y is lowered and made less than the value of X, the response and performance time of lower priority class 3 tasks is increased at the expense of the class 2 packet transfer task (e.g., 2.1) in the data communications device 100. For example, if Y=X/9, then for the total time allocated by the task scheduling algorithm to the primary data transfer task 2.1, only ten percent will actually be used by the data transfer task 2.1, while the remaining ninety percent will be yielded to other tasks, such as class 3 tasks 3.1 and 3.2.

As shown in FIG. 5B, if X is approximately equal to Y, then for the time slices 200-1, 200-3 (FIG. 4) which the task scheduling algorithm 114 assigns to the primary class 2 data transfer task 2.1, the task 2.1 consumes as much processor time as all class 3 tasks (e.g., 3.1, 3.2 and 3.3 in the former example in FIG. 4) put together.

It is to be understood that in the example embodiments, the critical class 1 tasks such as tasks 1.1 and 1.2 may be required at random times to service faults or other interrupts. These tasks 1.1 and 1.2 do not consume much processor time and since they have high associated priorities, these tasks are generally affected little by how long the primary data transfer task 2.1 or the non-critical tasks 3.1, 3.2 and/or 3.3 perform on the data communications device 100. For instance, it perhaps can be expected that class 1 tasks in FIGS. 5A, 5B and 5C only consume a fraction of the time represented by X+Y. As such, the class 1 tasks are represented by a dotted line in this figures to illustrate that they may be performed immediately, when needed and can perform until they have completed their processing. How the task scheduling algorithm 114 and the yielding scheduler 110 detect a fault and invoke a class 1 task such as 1.1 or 1.2 is generally beyond the scope of this invention.

According to various embodiments of this invention, different values of X and Y may be selected in a static or dynamic manner to obtain different (and possibly changing, if dynamic selection is used) balance points of processor allocation to the primary data transfer task 2.1. The value for X and Y may represent any unit of measurement, such,a milliseconds, blocks of clock cycles, or the like.

It is also to be understood that the above descriptions of possible values for X and Y are not meant to be limiting. Generally, the values for time periods X and Y can be determined based on computing system of data communications device 100 specific criteria. For example, some data communications devices in which the invention can be implemented can have multiple processors 101. As such, the data transfer task 2.1 running on one processor might not have to contend with as many other tasks that perform on the same processor. Another processor may be used to off-load the data transfer processor of less critical and non-primary tasks.

Figure 6:
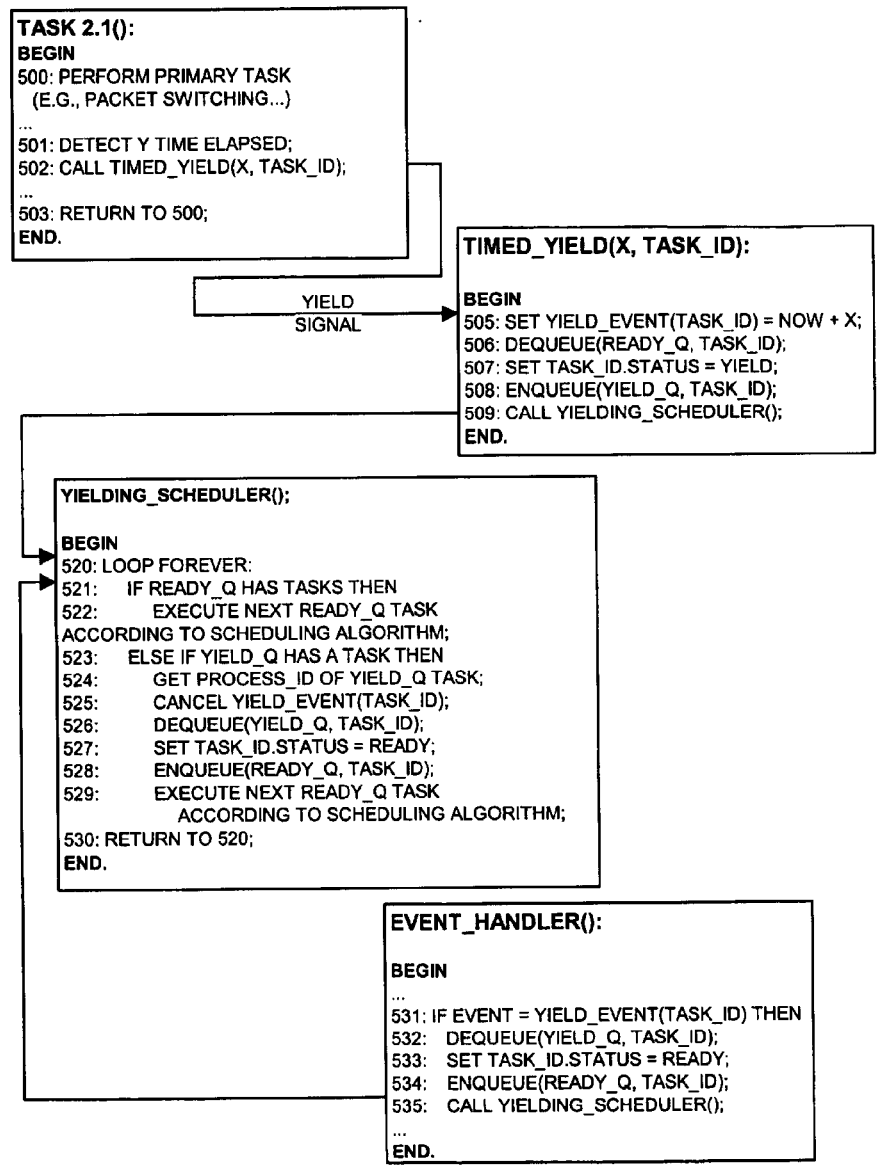
FIG. 6 illustrates a flow chart of pseudo-code processing that demonstrates how, after a period of time Y elapses, a task can yield processor time to another task or tasks for a period of time X, which is preferably one or more lower priority tasks.

FIG. 6 illustrates a pseudo-code example implementation of the invention. Each line of pseudo-code is given a respective unique number which will be referenced in this description. Generally, this embodiment implements the system of the invention via a TIMED_YIELD function, which handles the operations of obtaining the yield signal via the call to this function, and then handles queue manipulation as explained above. The calling of TIMED_YIELD serves as the yield signal in this embodiment. An EVENT_HANDLER is also provided as illustrated. The EVENT_HANDLER generally is a function that is responsible for detecting when events occur such as the end of the yield period X and then handles queue manipulation as explained above in response to such events. The illustration of system operation in FIG. 6 is for one iteration of a yield signal and yield time period X, whereas the flow chart in FIG. 4 illustrated the overall repetitive operation of the system of the invention.

In operation of this particular implementation, which is not meant to be limiting, the primary TASK 2.1 begins by performing packet switching at line 500. Line 501 causes the processor 101, which is currently performing the TASK 2.1, to detect a lapsing of time period Y. Line 502 then causes the processor 101 to call the TIMED_YIELD function. The TASK 2.1 passes a value X for the time period X and a TASK_ID as parameters to the TIMED_YIELD function. TASK_ID is the system identity of TASK 2.1.

Within the TIMED_YIELD function, line 505 causes the processor 101 to set a yield event called YIELD_EVENT, which is associated with the TASK_ID of TASK 2.1. The event YIELD_EVENT is a system event or timer or other mechanism that is set to occur and provide a signal that is sent to or trapped by the EVENT_HANDLER function at a time equal to the current time (NOW) plus the time period X provided as a parameter. Next, line 506 causes the processor 101 to dequeue the TASK 2.1 from the ready queue 113. Line 507 causes the processor 101 to set the status of the TASK 2.1 to "YIELD," and line 508 causes the processor 101 to en-queue the TASK 2.1 to the yield queue 112. The lines 505 through 508 essentially disable performance of the TASK 2.1. Line 509 then causes the processor to return performance to the YIELDING_SCHEDULER.

In line 520 in the YIELDING_SCHEDULER, the processor enters an infinite loop and at line 521 checks if the ready queue 113 has tasks to be performed. If one or more tasks exist in the ready queue 113, then line 522 causes the processor 101 to select and execute (e.g. initiates performance) at least one of the ready tasks according a selection made by the task scheduling algorithm 114 (FIG. 2). Line 523 is performed if no tasks existed in the ready queue 113 in line 521. If no tasks are ready to be performed (i.e., the ready queue 113 is currently empty), then line 523 causes the processor 101 to determine if the yield queue 112 contains any tasks. If there are tasks in the yield queue 112, line 524 is processed which causes the processor 101 obtain the identity of one or more processes in the yield queue 112. Then line 525 causes the processor 101 to cancel the yield events (YIELD_EVENTS) set for those tasks that are yielding to other tasks. This is done because if there are no tasks in the ready queue to perform, but there are tasks yielding time, there is no need to continue to yield time as the ready queue is void of tasks which can use the yield time. Lines 526 through 528 cause the processor 101 to dequeue (line 526) the yielded task(s) from the yield queue 112 and set the status of yielded tasks in this circumstance back to "READY" (line 527) and to place such tasks back into the ready queue 113 (line 528). Line 529 then causes the processor 101 to select a task for performance from the ready queue 113 according to the task scheduling algorithm 114. Thereafter, line 530 causes the processor 101 to return to line 520 and repeat the aforementioned processing for the next time slice.

Once an event such as YIELD_EVENT has been set via line 505 in the TIMED_YIELD function, a system timer, for example, begins counting down towards the event. Upon occurrence of the event, the EVENT_HANDLER function handles specific event processing. The EVENT_HANDLER is analogous to an interrupt handler. As shown at line 531, when a yield event occurs, this indicates that the yield period X is over and that the task or tasks which have been provided with some processor time (via a former yield signal) must now stop. When the yield event occurs, the event indicates to the EVENT_HANDLER via a TASK_ID which task the yield event is for. As such, line 532 causes the processor 101 to dequeue (line 532) the task identified by the yield event. Then the processor 101, via line 533, sets the status of this process back to "READY." Finally, line 534 causes the processor 101 to move the task back to the ready queue as a task that can now be selected again for performance. After these operations, line 535 causes the processor to return to the yielding scheduler.

If the EVENT_HANDLER operates asynchronously with other tasks, the yield events can be handled when they occur and this will cause the system of the invention to put tasks that have yielded time to other tasks back into the ready queue for selection as available tasks or processes for performance. In this manner, the system of the invention can allow a primary task to yield time to other lower priority tasks.

In an alternative configuration of the invention, there may be more than one primary task (e.g., multiple class 2 tasks). In such instances, if one primary task decides to yield time to lower priority tasks (via a yield signal), the alternative embodiment allows the TIMED_YIELD function to dequeue all tasks of the same priority as the task providing the yield function from the ready queue 113 to the yield queue 112. What this essentially does is to remove all primary tasks from selection for performance or, in other words, disables performance of all primary tasks, irrespective of which one actually generated the yield signal. As such, the only remaining tasks in the ready queue after line 509 will be the lower priority tasks. Accordingly, during task selection in step 521, the yielding scheduler 110 will use the task scheduling algorithm 114 to select from the lower priority tasks. This embodiment essentially avoids a problem that could occur if there are may primary tasks. If there are many of such high priority primary tasks, and only the one providing the yield signal is disabled from performance, the yielding scheduler 110 upon the next occurrence of line 522 would simply select another high-priority task to perform. Thus, by removing all of such tasks from the ready queue when any of such tasks generates a yield signal, this embodiment of the invention can assure that lower priority tasks will get processor time, which is one goal of the invention. This alternative embodiment can use, for example, the event handler to move all primary tasks back to the ready queue when the yield time X has elapsed. Also, in yet another embodiment, if there are multiple primary tasks, each should be equipped with the ability to yield processor time as provided by the invention so that none of the primary tasks can starve the lower priority tasks.

In another alternative embodiment, instead of moving tasks between a ready queue and the yield queue in response to a yield event, the system of the invention can simply temporarily adjust the priorities of the primary tasks to be less than the priorities of the other tasks and then call the yielding scheduler 110 to perform a task selected using the task scheduling algorithm 114. Since the priorities of the one or more primary tasks (e.g., 2.1) in this embodiment are simply temporarily adjusted lower than the priorities, for example of tasks 3.1 and 3.2, when the next task performance selection operation is completed, one of tasks 3.1 or 3.2 will have been selected for performance, since those tasks will have a temporarily higher priority than the primary task(s). This alternative embodiment can use the event handler to restore the priorities of the primary tasks when the yield time period X has elapsed.

As should now be clearly understood by those skilled in the art, other variations and modifications can be made to the general embodiments described herein without deviating from the spirit and scope of the invention.

One advantage provided by the invention over conventional systems is that the system of the invention can significantly optimize the processor performance for computing systems having a dedicated purpose, such as the data communications device 100 such as a router or switch which is primarily is designed to perform the data transfer task 2.1. In such cases, the system of the invention can help achieve balance between the data transfer task and the other tasks in the device 100. The system of the invention is also advantageous as it can be built on top of commercial operating systems with limited modifications and little performance penalties. It can also help achieve deterministic processor resource allocation.

It is also to be understood that the system of the invention may apply to many variations of the above described class or priority structure for task performance. The three classes 105 through 107 are merely examples presented for ease of description of the invention. For instance, the primary task 2.1 may be considered a first task, and the non-critical tasks 3.1 through 3.3 may be considered second tasks. Other variations of the systems of the invention can include an embodiment where the primary task 2.1 may have no control of time period Y, and may not generate the yield signal. Rather, the yielding scheduler 110 tracks the time periods Y and X. Such an embodiment can still use a separate task scheduling algorithm 114 for general task scheduling, and can use the invention as explained above to ensure that when the primary task 2.1 is scheduled, it is not allowed to monopolize the processor 101. This variation thus removes the yield event signaling and tracking operations from the primary task functionality and places such operations into the operating system or the yielding scheduler.

It is to be understood that in the claimed invention below, the first task in a preferred embodiment is the class 2 primary data transfer task in a data communications device, while the one or more second tasks to which the first task yields time are non-critical class 3 tasks. However, the invention is not limited as such, and thus the first task as claimed that can yield time to one or more other tasks may be any task in any type of computing device and the second task can also be any task, including a task of the same, higher, or lower priority. The point is that while the invention is preferably used in the context of the example given above, it is also applicable to computing systems of significantly varying configurations and purposes.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for performing a plurality of tasks of varying priorities in a computerized device having a processing unit, the method comprising the steps of:

performing a first task in the processing unit;

upon occurrence of a first time period, receiving a yield signal initiated by the first task during performance of the first task; and in response to receiving the yield signal at a yield function in the processing unit, temporarily disabling performance of the first task in the processing unit by performing the steps of:

a) setting a yield event to detect an elapsed performance time X corresponding to an end of a second time period;

b) temporarily disabling performance of the first task until the occurrence of the yield event; and c) calling a scheduling task in order to schedule performance of another task during the second time period until the occurrence of the yield event, wherein the step temporarily disabling performance of the first task temporarily disables performance of all tasks having a priority equivalent to the first task thus removing all tasks having the priority equivalent to the first task from a set of tasks available for performance, such that only tasks having a priority that is not equivalent to the first task remain in the set of task selectable by the scheduling tasks for performance during the second time period;

and performing at least one second task in the processing unit for the second time period, such that the first task yields performance time to the at least one second task after the first time period, irrespective of a performance time slice provided to the first task by the computerized device.

2. The method of claim 1 further including the steps of:

detecting an event indicating expiration of the second time period, and in response thereto, stopping performance of the at least one second task and enabling performance of the first task; and repeating the steps of performing a first task for the first time period, receiving a yield signal, temporarily disabling performance of the first task, performing the at least one second task for the second time period, detecting an event indicating expiration of the second time period and stopping performance of the at least one second task, such that no matter what priorities are assigned to the first and the at least one second tasks, each can perform on the processing unit for some time irrespective of a scheduling algorithm used to determine task performance.

3. The method of claim 2 wherein:

the processing unit controls the operation of a data communications device and the first task is a data transfer task designed to transfer data between ports of the data communications devices and the at least one second task is a lower priority task than the data transfer task; and wherein the steps of performing the first task for the first time period, receiving a yield signal from the first task, temporarily disabling performance of the first task, performing the at least one second task for the second time period, detecting expiration of the second time period and stopping performance of the at least one second task and allowing data transfer operations performed by the first task to take place without starving operations associated with the at least one second task.

4. The method of claim 1 wherein the step of performing the first task in the processing unit further includes the steps of:

upon the start of performance of the first task, setting an event to occur after an elapsed performance time equal to Y;

performing data processing operations associated with the first task; and during the step of performing, detecting an occurrence of the event indicating that the performance time Y has elapsed thus indicating an end of the first time period, and in response thereto, generating the yield signal from within the first task to indicate that the first task is able to yield performance time to another task.

5. The method of claim 4 wherein:

the step of generating the yield signal is performed from within the first task by calling a yield function which then performs on the processing unit; and wherein the yield function, when performing on the processing unit, causes the processing unit to perform the step of temporarily disabling performance of the first task.

6. The method of claim 1 wherein the step temporarily disabling performance of the first task further includes the steps of:

dequeuing the first task from a ready queue;

setting a status of the first task to a yield condition; and enqueuing the first task to a yield queue where it remains until the occurrence of the yield event.

7. The method of claim 1 wherein the step of performing the first task is initiated by a scheduler task performing on the processing unit, and wherein the scheduler task, when performing on the processing unit, causes the processing unit to perform the steps of:

i) determining if any tasks are available for performance during a task time period determined according to a task scheduling algorithm, and if tasks are available, performing the steps of:

a) selecting a task for performance according to the task scheduling algorithm such that tasks having a first priority that are available for performance are selected for performance over tasks having a second priority that are available for performance; and b) performing the selected task for the task time period determined by the task scheduling algorithm; and if it is determined that no tasks are available for performance in the step of determining, then performing the step of:

a) detecting if any tasks have been temporarily stopped from performance, and if so, enabling performance of at least one task that has been stopped from performance for the task time period determined by the task scheduling algorithm; and ii) detecting an end of the task time period used to perform a task according to the task scheduling algorithm and repeating the step of i) determining and ii) detecting.

8. The method of claim 7 wherein:
the end of the first time period as determined by the first task occurs before the end of task time period determined by the task scheduling algorithm; and
wherein the yield signal generated by the first task causes the at least one second task to be performed during the second time period which elapses at least in part in conjunction with the task time period assigned to the first task by the task scheduling algorithm, such that the first task can yield a portion time within the task time period assigned to the first task as determined by the task scheduling algorithm to the at least one second task.

9. The method of claim 7 wherein the step of enabling performance of at least one task removes the at least one task from a yield queue and returns the at least one task to a set of tasks available for performance.

10. The method of claim 1 further including the step of:
classifying each of the plurality of tasks by assigning a priority to each task, such that tasks having a first priority are preferred for performance in the processing unit over tasks having a second priority.

11. The method of claim 1 wherein the first task is a higher priority task and the at least one second task is a lower priority task and wherein the first time period during which the higher priority task performs before yielding performance to a lower priority task is set to be approximately equal to a minimum response time requirement of the lower priority task.

12. The method of claim 1 wherein the first task is a higher priority task and the at least one second task is a lower priority task and wherein the second time period during which the higher priority task yields performance to a lower priority task is set to be approximately equal to a response time requirement of the higher priority task.

13. The method of claim 1 wherein the first time period is greater than the second time period such that the first task performs longer than the at least one second task.

14. The method of claim 1 wherein the second time period is greater than the first time period such that the at least one second task performs longer than the first task.

15. The method of claim 1 wherein if the step of initiating performance of a first task initiates performance of a system critical task, the system critical task is performed to completion and is performed with a highest priority of all tasks in the computerized device.

16. The method of claim 1 wherein the plurality of tasks in the computerized device includes critical tasks of a highest priority that may be independently initiated for performance, and wherein the method includes the steps of:
determining if a critical task is required for performance, and if so, preempting the performance of any currently performing first and second task in order to perform the critical task, and wherein the critical task performs to completion once started.

17. A method for performing tasks in a data communications device by dividing processor time between the tasks according to a task scheduling algorithm, the method comprising the steps of:
executing at least one data transfer task, the data transfer task performing the steps of:
processing data through the data communications device until an event occurs indicating a time period Y has elapsed; and
detecting, from within the data transfer task, that the event indicating the time period Y has elapsed and providing a yield signal from within the data transfer task to the data communications device, the yield signal indicating a time period X in which another task may perform,
wherein the data transfer task is executed during a task time period allocated to the data transfer task by the task scheduling algorithm, and wherein the event indicating that the time period Y has elapsed is detected by the data transfer task and occurs within the task time period; and
upon the detecting of the event, the data transfer task provides the yield signal to yield at least a portion of processor time that occurs during the task time period to at least one other task, the portion not to exceed the time period X.

18. The method of claim 17 further including the steps of:
executing an operating system task to perform the steps of:
receiving the yield signal and temporarily disabling performance of the data transfer task;
selecting at least one other task besides the data transfer task to perform during the time period X;
performing the at least one other task for the time period X;
upon detecting expiration of the time period X, enabling performance of the data transfer task; and
repeating the step of executing at least one data transfer task.

19. A data communications device comprising:
a processing unit;
a memory system encoded with a plurality of tasks that can perform in the processing unit;
an interconnection mechanism that couples the memory system and the processing unit;
ports to receive and transmit data, the ports coupled to the interconnection mechanism;
wherein the processing unit performs a first task in the memory system having a first priority, the first task performing for a first time period determined by the first task and upon expiration of the first time period, the first task generating a yield signal, the first task is a data transfer task responsible for processing data through the data communications device using at least one port;
wherein the memory system is encoded with an operating system task which controls scheduling of tasks for performance on the processing unit;
wherein, in response to the yield signal, the processing unit temporarily disables performance of the first task and selects a at least one second task for performance and performs the at least one second task in the memory system having a second priority for a second time period, such that the first task yields performance time in the processing unit to the at least one second task irrespective of priorities and scheduling of the first and the at least one second task;
wherein, during performance of the first task, the first task processes data through the data communications device for a time period Y and detects an event indicating the occurrence of the end of the time period Y and in response thereto, provides the yield signal from within the data transfer task to the operating system task, the yield signal indicating a time period X in which the selected at least one second task may perform during a task time period assigned by the operating system task to the data transfer task; and wherein the first and second time periods are set such that no matter how frequently the operating system task attempts to schedule the data transfer task, a task selected as the second selected task can still perform for a period of time equal to the second time period when the yield signal is received from the data transfer task, thus preventing processor time starvation of the at least one second task.

20. The data communications device of claim 19 wherein:

the processing unit detects expiration of the second time period, and in response thereto, stops performance of the selected at least one second task; and wherein the processing unit repeatedly performs the first task for the first time period and in response to the yield signal generated by the first task, temporarily disables performance of the first task and selects and performs at least one second task for the second time period, and detects expiration of the second time period and stops performance of the selected at least one second task, such that the first task can control when another selected at least one second task can perform and can provide time for performance of the another selected at least one second task on the processing unit for the second time period by generation of the yield signal.

21. The data communications device of claim 19 wherein the memory system is encoded with a ready queue and a yield queue, and wherein when the first task generates the yield signal, the processing unit removes the first task from the ready queue and places the first task in the yield queue for the duration of the second time period, and upon expiration of the second time period, the processing unit removes the first task from the yield queue and places the first task in the ready queue such that the first task can be scheduled for performance.

22. A method that prevents a task scheduling algorithm from starving lower priority tasks of processor time, the method comprising the step of:

performing a task scheduling algorithm to schedule a plurality of tasks having varying priorities in a time sliced manner for performance on a processing unit;

during performance of a higher priority task in the processing unit, after a first time period, allowing the higher priority task to generate a yield signal to yield processing time to at least one lower priority task; and receiving the yield signal from the higher priority task, and in response thereto, temporarily disabling performance of the higher priority task and starting performance of a selected at least one lower priority task for a second time period, upon the expiration of which, performance of the selected lower priority task is stopped and the task scheduling algorithm selects another task for performance, wherein the first time period during which the higher priority task performs before yielding performance to the at least one lower priority task is set to be approximately equal to a minimum response time requirement of the at least one lower priority task.

23. The method of claim 22 wherein:

the step of temporarily disabling performance of the higher priority task removes the higher priority task from a set of tasks available for performance and uses the task scheduling algorithm to select another task to perform as the at least one lower priority task from the set of tasks available for performance.

24. The method of claim 22 wherein the higher priority task is a data transfer task for transferring data in a data communications device, and wherein the first and second time periods are dynamically adjustable based on data traffic loads experienced by the data transfer task.

25. The method of claim 22 wherein the second time period during which the higher priority task yields performance to the at least one lower priority task is set to be approximately equal to a minimum response time requirement of the higher priority task.

26. A computer program product having a computer-readable medium including computer program logic encoded thereon for scheduling tasks in a computerized device, such that the computer program logic, when executed on at least one processing unit with the computerized device, causes the at least one processing unit to perform the steps of:

performing a first task in the processing unit;

upon occurrence of a first time period, receiving a yield signal initiated by the first task during performance of the first task; and in response to receiving the yield signal at a yield function in the processing unit, temporarily disabling performance of the first task in the processing unit by performing the steps of:

a) setting a yield event to detect an elapsed performance time X corresponding to an end of a second time period;

b) temporarily disabling performance of the first task until the occurrence of the yield event; and c) calling a scheduling task in order to schedule performance of another task during the second time period until the occurrence of the yield event, wherein the step temporarily disabling performance of the first task temporarily disables performance of all tasks having a priority equivalent to the first task thus removing all tasks having the priority equivalent to the first task from a set of tasks available for performance, such that only tasks having a priority that is not equivalent to the first task remain in the set of task selectable by the scheduling tasks for performance during the second time period;

and performing at least one second task in the processing unit for the second time period, such that the first task yields performance time to the at least one second task after the first time period, irrespective of a performance time slice provided to the first task by the computerized device.

27. The computer program product of claim 26 wherein the computer program logic, when executed on the at least one processing unit, further causes the processing unit to perform the steps of:

detecting an event indicating expiration of the second time period, and in response thereto, stopping performance of the at least one second task; and repeating the steps of performing a first task for the first time period, receiving a yield signal, temporarily disabling performance of the first task, performing the at least one second task for the second time period, detecting an event indicating expiration of the second time period and stopping performance of the at least one second task, such that no matter what the priorities are of the first and the at least one second task, each can perform on the processing unit for some time irrespective of a scheduling algorithm used to determine task performance.

28. The computer program product of claim 27 wherein the computer program logic that causes the processing unit to execute the step of performing a first task on the processing unit for the first time period further includes computer program logic, that when executed, causes the processing unit to perform the steps of:

upon the start of performance of the first task, setting an event to occur after an elapsed performance time equal to Y;

performing operations associated with the first task; and during the step of performing, detecting an occurrence of the event indicating that the performance time Y has elapsed thus indicating an end of the first time period, and in response thereto, generating the yield signal from within the first task to indicate that the first task is ready to yield performance time of the processing unit to another task.

29. The computer program product of claim 28 wherein:

the logic that performs the step of generating the yield signal is performed, when executed, from within the first task by calling a yield function which then performs on the processing unit; and wherein the yield function, when performing on the processing unit, causes the processing unit to perform the step of temporarily disabling performance of the first task.

30. A computer program product having a computer-readable medium including computer program logic encoded thereon for performing tasks in a data communications device by dividing processor time between the tasks according to a task scheduling algorithm, such that the computer program logic, when executed on at least one processing unit within the computerized device, causes the at least one processing unit to perform the steps of:

executing at least one data transfer task, the data transfer task performing the steps of:

processing data passing through the data communications device until an event occurs indicating a time period Y has elapsed;

detecting the event indicating the time period Y has elapsed from within the data transfer task, and providing a yield signal from within the data transfer task, the yield signal indicating a time period X in which another task may perform, wherein the data transfer task is executed during a task time period allocated to the data transfer task by the task scheduling algorithm, and wherein the event indicating that the time period Y has elapsed is detected by the data transfer task and occurs within the task time period; and upon the detection of the event, the data transfer task provides the yield signal to yield at least a portion of processor time that occurs during the task time period to at least one other task, the portion not to exceed the time period X.

31. A computer program product having a computer-readable medium including computer program logic encoded thereon for preventing a task scheduling algorithm from starving lower priority tasks of processor time, such that the computer program logic, when executed on at least one processing unit within the computerized device, causes the at least one processing unit to perform the steps of:

performing a task scheduling algorithm to schedule a plurality of tasks having varying priorities in a time sliced manner for performance on a processing unit;

during performance of a higher priority task in the processing unit, after a first time period, allowing the higher priority task to generate a yield signal to yield processing time to at least one lower priority task;

receiving the yield signal from the higher priority task, and in response thereto, temporarily disabling performance of the higher priority task and starting performance of a selected at least one lower priority task for a second time period, upon the expiration of which, performance of the at least one lower priority task is stopped and the task scheduling algorithm selects another task for performance, such that, when executed in the processing unit, the higher priority task is a data transfer task for transferring data in a data communications device, and wherein the first and second time Periods are dynamically adjustable based on data traffic loads experienced by the data transfer task.

32. The computer program product of claim 31, wherein:

the computer program logic that, when executed, performs the step of temporarily disabling performance of the higher priority task removes the higher priority task from a set of tasks available for performance and uses the task scheduling algorithm to select another task to perform as the at least one lower priority task from the set of tasks available for performance.

33. The computer program product of claim 31, wherein the computer program logic is encoded such that, when executed in the processing unit, the higher priority task is a data transfer task for transferring data in a data communications device, and wherein the first and second time periods are dynamically adjustable based on data traffic loads experienced by the data transfer task.

34. The computer program product of claim 31, wherein the computer program logic is encoded such that, when executed in the processing unit, the second time period during which the higher priority task yields performance to the at least one lower priority task is set to be approximately equal to a response time requirement of the higher priority task.

35. A method for performing a plurality of tasks of varying priorities in a computerized device, the method comprising the steps of:

initiating performance of a first task;

upon occurrence of a first time period, receiving a yield signal initiated by the first task during performance of the first task; and in response to receiving the yield signal, temporarily disabling performance of the first task; and performing at least one second task for a second time period, such that the first task yields performance time to the at least one second task after the first time period, irrespective of a performance time slice provided to the first task by the computerized device, wherein the first task is a higher priority task and the at least one second task is a lower priority task and wherein the first time period during which the higher priority task performs before yielding performance to a lower priority task is set to be approximately equal to a minimum response time requirement of the lower priority task.

36. A method for performing a plurality of tasks of varying priorities in a computerized device, the method comprising the steps of:

initiating performance of a first task;

upon occurrence of a first time period, receiving a yield signal initiated by the first task during performance of the first task; and in response to receiving the yield signal, temporarily disabling performance of the first task; and performing at least one second task for a second time period, such that the first task yields performance time to the at least one second task after the first time period, irrespective of a performance time slice provided to the first task by the computerized device, wherein the first task is a higher priority task and the at least one second task is a lower priority task and wherein the second time period during which the higher priority task yields performance to a lower priority task is set to be approximately equal to a response time requirement of the higher priority task.

* * * * *

UNITED STATES PATENT AND TRADEMARK OFFICE
CERTIFICATE OF CORRECTION

PATENT NO.     : 6,757,897 B1
DATED          : June 29, 2004
INVENTOR(S)    : Zhanhe Shi et al.

It is certified that error appears in the above-identified patent and that said Letters Patent is hereby corrected as shown below:

Column 25,
Line 42, "of task selectable by" should read -- of tasks selectable by --

Signed and Sealed this

Twenty-eighth Day of December, 2004

JON W. DUDAS
*Director of the United States Patent and Trademark Office*